US011480041B2

(12) United States Patent
Peters et al.

(10) Patent No.: US 11,480,041 B2
(45) Date of Patent: Oct. 25, 2022

(54) IN-LINE TREATMENT CARTRIDGE AND METHODS OF USING SAME

(71) Applicant: CARBO CERAMICS INC., Houston, TX (US)

(72) Inventors: Billy Dale Peters, Fort Worth, TX (US); Joshua Leasure, Houston, TX (US); Todd Roper, Katy, TX (US); Chad Cannan, Lancaster, NY (US); Jeff Michael Hebert, Katy, TX (US); Thu Lieng, Richmond, TX (US)

(73) Assignee: CARBO CERAMICS INC., Houston, TX (US)

( * ) Notice: Subject to any disclaimer, the term of this patent is extended or adjusted under 35 U.S.C. 154(b) by 0 days.

(21) Appl. No.: 16/725,143

(22) Filed: Dec. 23, 2019

(65) Prior Publication Data
US 2020/0149382 A1    May 14, 2020

Related U.S. Application Data

(63) Continuation of application No. 15/359,257, filed on Nov. 22, 2016, now Pat. No. 10,513,916, which is a
(Continued)

(51) Int. Cl.
*E21B 43/267* (2006.01)
*C09K 8/80* (2006.01)
(Continued)

(52) U.S. Cl.
CPC ............ *E21B 43/267* (2013.01); *C09K 8/805* (2013.01); *E21B 43/088* (2013.01); *C09K 8/528* (2013.01);
(Continued)

(58) Field of Classification Search
None
See application file for complete search history.

(56) References Cited

U.S. PATENT DOCUMENTS

| 2,378,817 A | 6/1945 | Wrightsman et al. |
| 2,675,335 A | 4/1954 | Rankin et al. |
| (Continued) | | |

FOREIGN PATENT DOCUMENTS

| CN | 88100379 A | 11/1988 |
| CN | 101115906 A | 1/2008 |
| (Continued) | | |

OTHER PUBLICATIONS

International Search Report and Written Opinion for International Application No. PCT/US15/50759 dated Jul. 12, 2016.
(Continued)

*Primary Examiner* — Jeffrey D Washville
(74) *Attorney, Agent, or Firm* — Patterson + Sheridan, LLP

(57) ABSTRACT

An in-line treatment cartridge and methods of using same are disclosed. The in-line treatment cartridge can include a cylindrical body configured to allow fluid to flow therethrough and a plurality of particulates contained within the body. At least one particulate of the plurality of particulates can include a chemical treatment agent. The at least one chemical treatment agent can separate from the at least one particulate upon contact with a fluid.

7 Claims, 11 Drawing Sheets

Related U.S. Application Data continuation-in-part of application No. 14/857,564, filed on Sep. 17, 2015, now Pat. No. 9,951,267.

(60) Provisional application No. 62/051,719, filed on Sep. 17, 2014.

(51) Int. Cl.
*E21B 43/08* (2006.01)
*C09K 8/60* (2006.01)
*C09K 8/532* (2006.01)
*C09K 8/528* (2006.01)

(52) U.S. Cl.
CPC ............... *C09K 8/532* (2013.01); *C09K 8/60* (2013.01); *C09K 2208/10* (2013.01); *C09K 2208/12* (2013.01); *C09K 2208/20* (2013.01); *C09K 2208/24* (2013.01); *C09K 2208/26* (2013.01); *C09K 2208/32* (2013.01)

(56) References Cited

U.S. PATENT DOCUMENTS

| | | |
|---|---|---|
| 4,068,718 A | 1/1978 | Cooke, Jr. et al. |
| 4,179,429 A | 12/1979 | Hanauye et al. |
| 4,427,068 A | 1/1984 | Fitzgibbon |
| 4,440,866 A | 4/1984 | Lunghofer et al. |
| 4,873,145 A | 10/1989 | Okada et al. |
| 4,888,240 A | 12/1989 | Graham et al. |
| 5,188,175 A | 2/1993 | Sweet |
| 5,218,038 A | 6/1993 | Johnson et al. |
| 5,591,700 A | 1/1997 | Harris et al. |
| 5,964,291 A | 10/1999 | Bourne et al. |
| 6,444,316 B1 | 9/2002 | Reddy et al. |
| 6,527,051 B1 | 3/2003 | Reddy et al. |
| 7,036,591 B2 | 5/2006 | Cannan et al. |
| 7,216,705 B2 | 5/2007 | Saini et al. |
| 7,598,209 B2 | 10/2009 | Kaufman et al. |
| 8,399,597 B2 | 3/2013 | Pullichola et al. |
| 8,664,168 B2 | 3/2014 | Steiner |
| 8,865,631 B2 | 10/2014 | Eldred et al. |
| 8,883,693 B2 | 11/2014 | Eldred et al. |
| 9,670,400 B2 | 6/2017 | Eldred et al. |
| 2003/0147821 A1 | 8/2003 | Victor |
| 2005/0002996 A1 | 1/2005 | Sojka |
| 2005/0059558 A1 | 3/2005 | Blauch et al. |
| 2005/0129759 A1 | 6/2005 | Sojka |
| 2005/0245416 A1 | 11/2005 | Veening et al. |
| 2008/0078547 A1 | 4/2008 | Sinclair et al. |
| 2010/0096342 A1 | 4/2010 | Roberts |
| 2010/0307744 A1 | 12/2010 | Cochet et al. |
| 2012/0067532 A1 | 3/2012 | Lee |
| 2012/0122741 A1 | 5/2012 | Welton |
| 2012/0227968 A1 | 9/2012 | Eldred et al. |
| 2012/0279703 A1 | 11/2012 | McDaniel et al. |
| 2013/0056204 A1 | 3/2013 | McDaniel et al. |
| 2013/0126158 A1 | 5/2013 | Gupta et al. |
| 2013/0295319 A1 | 11/2013 | Yeager et al. |
| 2014/0162911 A1 | 6/2014 | Monastiriotis et al. |
| 2014/0262247 A1 | 9/2014 | Duenckel et al. |
| 2015/0119301 A1 | 4/2015 | McDaniel et al. |
| 2016/0017214 A1 | 1/2016 | Eldred et al. |
| 2017/0074072 A1 | 3/2017 | Peters et al. |
| 2020/0261924 A1* | 8/2020 | Rothman .................. B03D 1/14 |

FOREIGN PATENT DOCUMENTS

| | | |
|---|---|---|
| EP | 2047061 B1 | 3/2014 |
| WO | 2012136734 A1 | 10/2012 |
| WO | 2014052459 A1 | 4/2014 |
| WO | 2014144464 A2 | 9/2014 |
| WO | 2015097116 A1 | 7/2015 |

OTHER PUBLICATIONS

Supplementary European Search Report dated May 14, 2018 for Application No. 15863889.0.

Tianping, Huang et al., "SPE 135088 Field Case Study on Formation Fines Control With Nanoparticles in Offshore Wells", Society of Petroleum Engineers, Jan. 1, 2010, pp. 2-3.

Full Examination Report No. 1 for Australian Application No. 2015354717 dated Oct. 24, 2018.

Full Examination Report No. 2 for Australian Application No. 2015354717 dated Oct. 24, 2018.

Office Action for Eurasian Application No. 201790633 dated Jan. 11, 2019.

Chinese Office Action dated Jul. 1, 2019 for Application No. 201580056874.1.

* cited by examiner

IN-LINE TREATMENT CARTRIDGE AND METHODS OF USING SAME

CROSS-REFERENCE TO RELATED APPLICATIONS

This application is a continuation of U.S. patent application Ser. No. 15/359,257, filed on Nov. 22, 2016, which is a continuation-in-part of U.S. patent application Ser. No. 14/857,564, filed on Sep. 17, 2015, which claims benefit of and priority to U.S. Provisional Patent Application No. 62/051,719, filed on Sep. 17, 2014. The aforementioned applications are each incorporated herein by reference in their entirety.

TECHNICAL FIELD

The present disclosure relates to fluid treatment systems and more particularly, to cartridges for in-line treatment of fluids.

BACKGROUND

In-line fluid treatment devices, which are adapted to be connected to a fluid supply and a fluid exhaust, whereby all the fluid from the supply must pass therethrough to reach the exhaust, are oftentimes used in order to effectively treat all fluid flowing from a particular supply. A benefit of in-line treatment devices is that they can be installed on a primary fluid line, thereby allowing for simple installation and maintenance. However, current in-line fluid treatment devices suffer from several limitations. For example, known devices tend to fail if subjected to high internal pressures, which are typical to chemical processing and oil and gas environments.

What is needed, therefore, is an in-line fluid treatment device capable of withstanding the high internal pressures of certain oil and gas or process equipment.

BRIEF DESCRIPTION OF THE DRAWINGS

The present disclosure may best be understood by referring to the following description and accompanying drawings that are used to illustrate embodiments of the disclosure. In the drawings.

DETAILED DESCRIPTION

Figure 1:
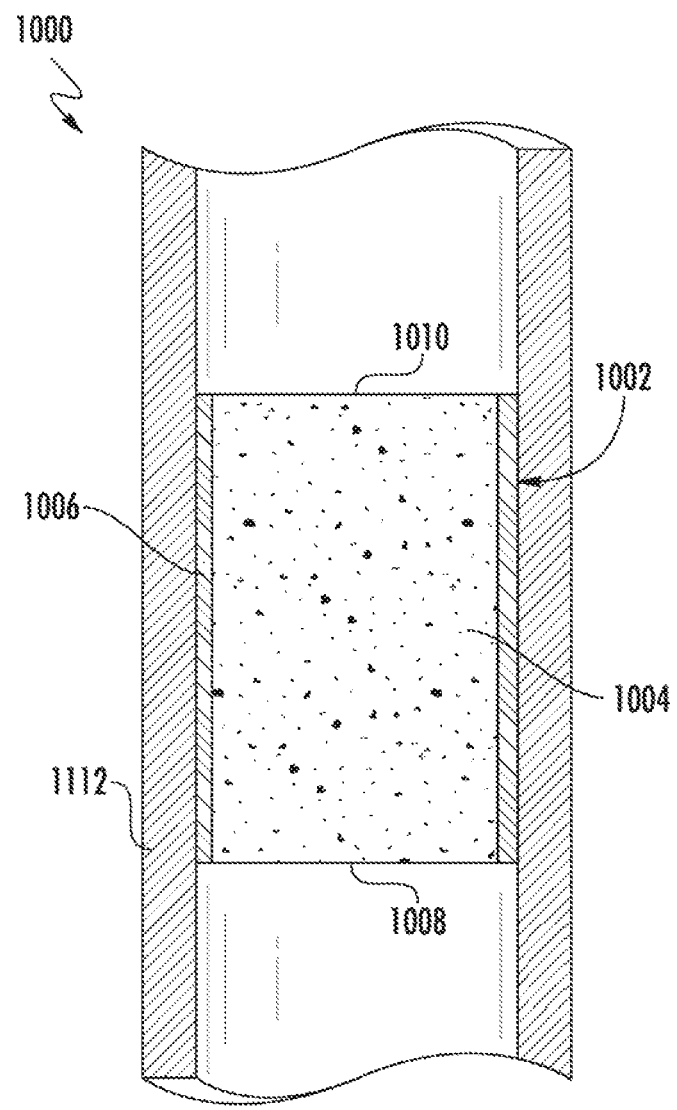
FIG. 1 is a cross sectional side view of an assembly having a cartridge placed within a tubular in accordance with several exemplary embodiments described herein.

In the following description, numerous specific details are set forth. However, it is understood that embodiments of the disclosure may be practiced without these specific details. In other instances, well-known structures and techniques have not been shown or described in detail in order not to obscure the understanding of this description. Additionally, as used herein, the term "exemplary" is intended to mean serving as an illustration or example, and is not intended to indicate a preference.

The term "apparent specific gravity," as used herein, is the weight per unit volume (grams per cubic centimeter) of the particles, including the internal porosity. The apparent specific gravity values given herein were determined by the Archimedes method of liquid (water) displacement according to API RP60, a method which is well known to those of ordinary skill in the art. For purposes of this disclosure, methods of testing the characteristics of the proppant in terms of apparent specific gravity are the standard API tests that are routinely performed on proppant samples. Additionally, as used herein, the term "exemplary" is intended to mean serving as an illustration or example, and is not intended to indicate a preference.

The term "conductivity," as used herein, is defined as the product of the width of a hydraulically created subterranean fracture and the permeability of the proppant that remains in the fracture.

The term "internal interconnected porosity," as used herein, is defined as a percentage of the pore volume, or void volume space, over the total volume of a porous ceramic particulate.

The term "degradable," as used herein, means the ability of a chemical or coating to react to dissolve or breakdown into smaller components under one or more downhole conditions.

The term "infuse," as used herein, means to inject, attach, introduce, or otherwise include a material into a porous substrate, such as a porous ceramic.

The term "ceramic," as used herein, means any non-metallic, inorganic solid material.

The term "ceramic proppant," as used herein, means any man-made or synthetic ceramic particulate(s).

The term "proppant," as used herein, means material that includes one or more (e.g., tens, hundreds, thousands, millions, or more) of individual proppant particulates or elements.

The term "proppant particulate," as used herein, means any natural or man-made particulate solid.

Disclosed herein are in-line fluid treatment systems including in-line fluid treatment cartridges. The in-line fluid treatment cartridge disclosed herein can include a cylindrical body having first and second ends. A first screen can be attached to the first end and a second screen can be attached to the second end. The first and second screens can have a mesh opening sufficient to permit free flow of fluid through the cartridge while preventing escape of the plurality of particles inside the cartridge. The plurality of particles can be arranged inside the cartridge in a manner that does not significantly impede the flow of fluid through the cartridge. The plurality of particles can include any suitable particulate material, such as proppant particulates.

A proppant particulate containing one or more chemical treatment agents for use in an in-line fluid treatment cartridge is also disclosed herein. The one or more chemical treatment agents can be disposed on, attached to, coated on, infused into, combined with, or otherwise contained on or in the proppant particulate to produce the proppant containing the one or more chemical treatment agents, also referred to as a chemical treatment agent containing proppant particulate. The proppant particulate can be or include a ceramic particulate. The ceramic particulate can include sand, porous ceramic proppant, and non-porous ceramic proppant. The chemical treatment agent containing proppant particulate can be coated with a resin material. The chemical treatment agent containing proppant particulate can also be uncoated.

FIG. 1 is a cross-sectional side view of an assembly 1000 having a cartridge 1002 placed within a tubular member, such as tubular 1112. The cartridge 1002 can include a body 1006, having an open first end 1008 and an open second end 1010, and a proppant pack 1004 containing a plurality of particulates. The body 1006, the open first end 1008 and the open second end 1010 can be configured such that fluid is permitted to flow therethrough. As shown in FIG. 1, the proppant pack 1004 can be contained within the body 1006. In one or more exemplary embodiments, the proppant pack 1004 can be contained within the body 1006 via one or more screens, filters, or any perforated material sufficient to contain the proppant particulates in the body 1006 while maintaining open fluid communication of the interior of the cartridge 1002 with the interior of the tubular 1112. The tubular 1112 can be a component of, attached to, or otherwise in fluid communication with, a heat exchanger, a tubular reactor, a subsea riser, a pipeline, a pump, or any other suitable process equipment.

The cartridge 1002 and its body 1006 can have any suitable size and shape, such as a size and shape corresponding to a size and shape of an interior surface of the tubular 1112. For example, the cartridge 1002 can be concentrically arranged within the tubular 1112. The outer surface of the cartridge 1002 can form a fluid tight seal with the inner surface of the tubular 1112 so that all or substantially all of fluid flowing through the tubular 1112 is forced into the interior of the cartridge 1002 and through the proppant pack 1004, from the open first end 10008 through the open second end 1010. At least a portion of the cylindrical body 1006 can be attached in any suitable manner to an inner wall or surface of the tubular 1112 for securing the cartridge 1002 to the tubular 1112. For example, the body 1006 can include a threaded section (not shown) that is capable of mating with a corresponding threaded section (not shown) located on or inside the tubular 1112.

Figure 2:
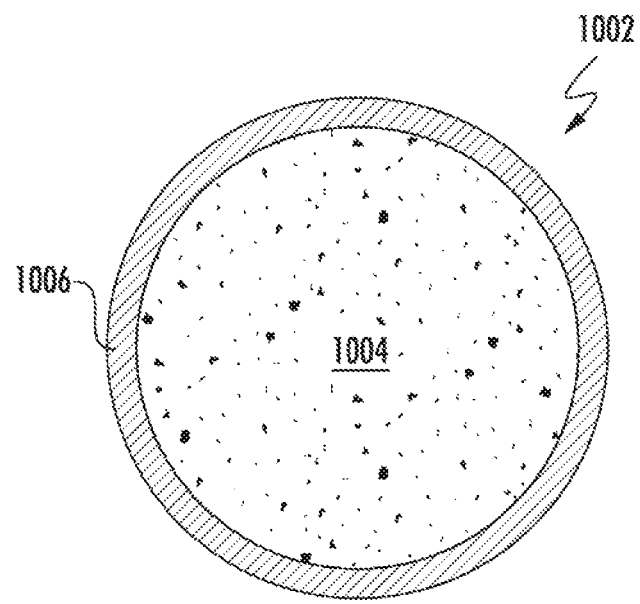
FIG. 2 is a cross sectional end view of the cartridge shown in FIG. 1.

FIG. 2 is a cross-sectional end view of the cartridge 1002. The proppant pack 1004 can fill an entire cross section of an inner volume of the body 1006 and/or the cartridge 1002. In one or more exemplary, embodiments, the proppant pack 1004 at least partially fills the inner volume of the body 1006 of the cartridge 1002. The proppant pack 1004 can fill at least 10 vol %, at least 25 vol %, at least 50 vol %, at least 75 vol %, at least 90 vol %, at least 95 vol %, or at least 99 vol % or about 100 vol % of the inner volume of the body 1006. In one or more exemplary embodiments, the proppant pack 1004 can occupy from about 10 vol % to about 90 vol %, from about 20 vol % to about 80 vol %, or from about 30 vol % to about 70 vol % of the inner volume of the body 1006. The proppant pack 1004 can have any suitable density of particulates. For example, the amount of particulates in the proppant pack 1004 can be selected to permit any desirable rate of fluid flow from the first end 1008 to the second end 1010. In one or more exemplary embodiments, the proppant pack 1004 can be a fixed bed of proppant particulates, a dense bed of proppant particulates or a fluidized bed of proppant particulates.

Figure 3:
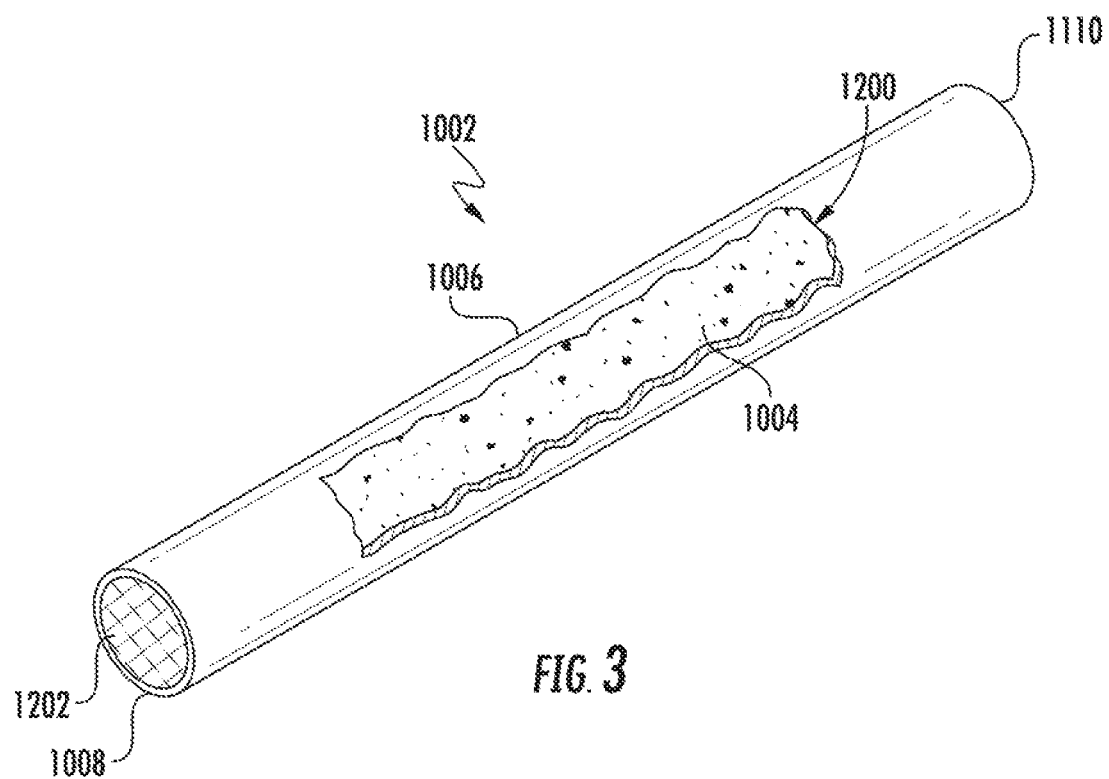
FIG. 3 is a perspective view of the cartridge shown in FIGS. 1 and 2.

FIG. 3 is a perspective view of the cartridge 1002 having a cutaway section 1200 showing the proppant pack 1004. The proppant pack can be at least partially contained within the body 1006 by fluid permeable screens 1202 with a first screen 1202 located proximate the first end 1008 and a second screen (not shown) located proximate the second end 1010. The screens 1202 can have any configuration or design suitable for permitting fluid flow into and out of the cartridge 1002 and, at the same time, blocking proppant flow out of or from the cartridge 1002.

The particulates of the proppant pack 1004 can be proppant particulates such as ceramic proppant, sand, resin coated sand, plastic beads, glass beads, and other ceramic or resin coated proppants. Such proppant particulates can be manufactured according to any suitable process including, but not limited to continuous spray atomization, spray fluidization, drip casting, spray drying, or compression. Suitable proppant particulates and methods for manufacture are disclosed in U.S. Pat. Nos. 4,068,718, 4,427,068, 4,440, 866, 5,188,175, 7,036,591, 8,865,631 and 8,883,693, U.S. Patent Application Publication No. 2012/0227968, and U.S. patent application Ser. Nos. 14/502,483 and 14/802,761, the entire disclosures of which are incorporated herein by reference, the entire disclosures of which are incorporated herein by reference.

Figure 4:
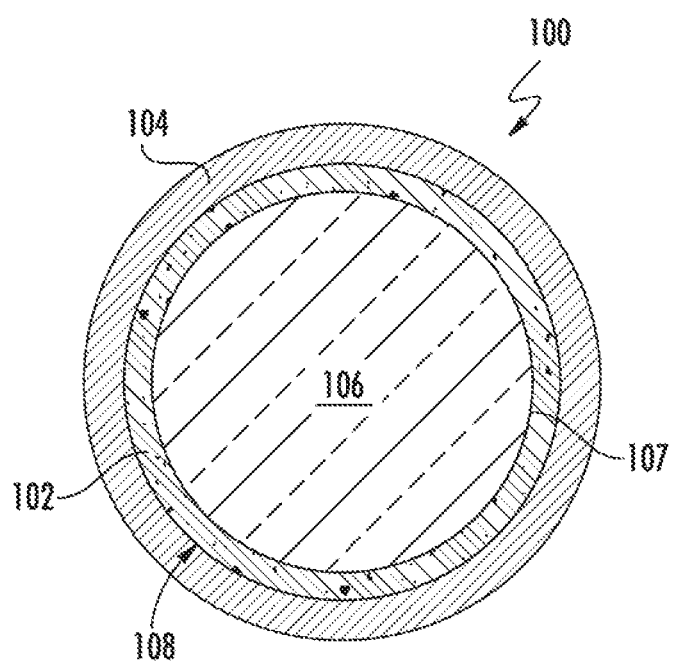
FIG. 4 is a cross sectional view of a coated proppant containing a chemical treatment agent disposed between a coating and a proppant particulate in accordance with several exemplary embodiments described herein.

FIG. 4 is a cross sectional view of a coated proppant 100 containing a chemical treatment agent 102 disposed between a coating 104 and a proppant particulate 106 in accordance with one or more embodiments. A layer 108 of chemical treatment agent 102 can be formed between the coating 104 and the proppant particulate 106. For example, the layer 108 of chemical treatment agent 102 can surround and/or be deposited on an outer surface 107 of the proppant particulate 106. The layer 108 of chemical treatment agent 102 can coat or cover at least about 10%, at least about 30%, at least about 50%, at least about 70%, at least about 90%, at least about 95%, or at least about 99% of the entire outer surface area of the proppant particulate 106. For example, the layer 108 of chemical treatment agent 102 can coat or cover about 100% of the entire outer surface area of the proppant particulate 106. The coating 104 can coat or cover at least about 10%, at least about 30%, at least about 50%, at least about 70%, at least about 90%, at least about 95%, or at least about 99% of the entire outer surface area of the layer 108 of chemical treatment agent 102 disposed on the proppant particulate 106. For example, the coating 104 can coat or cover about 100% of the entire outer surface area of the proppant particulate 106 that is coated or covered by the layer 108 of chemical treatment agent 102 such that the layer 108 is disposed between the particulate 106 and the coating 104. The coating 104 can include any suitable resin material and/or epoxy resin material as disclosed herein. The coating 104 can be degradable or non-degradable.

According to several exemplary embodiments, the chemical treatment agent 102 is present on the proppant particulate 106 in any suitable amount. According to several exemplary embodiments, the coated proppant 100 contains at least about 0.01 wt %, at least about 0.1 wt %, at least about 0.5 wt %, at least about 1 wt %, at least about 2 wt %, at least about 4 wt %, at least about 6 wt %, or at least about 10 wt % chemical treatment agent 102 based on the total weight of the coated proppant 100. According to several exemplary embodiments, the coating 104 is present on the proppant particulate 106 in any suitable amount. According to several exemplary embodiments, the coated proppant 100 contains about 0.01 wt %, about 0.2 wt %, about 0.8 wt %, about 1.5 wt %, about 2.5 wt %, about 3.5 wt %, or about 5 wt % to about 8 wt %, about 15 wt %, about 30 wt %, about 50 wt %, or about 80 wt % resin material, based on the total weight of the coated proppant 100.

The layer 108 of the chemical treatment agent 102 can have any suitable thickness. The layer 108 can have thickness of at least about 0.1 nm, at least about 0.5 nm, at least about 1 nm, at least about 2 nm, at least about 4 nm, at least about 8 nm, at least about 20 nm, at least about 60 nm, at least about 100 nm, or at least about 200 nm. For example, the layer 108 can have thickness from about 1 nm, about 5 nm, about 10 nm, about 25 nm, about 50 nm, about 100 nm, or about 150 nm to about 200 nm, about 300 nm, about 500 nm, or about 1,000 nm or more.

Figure 5:
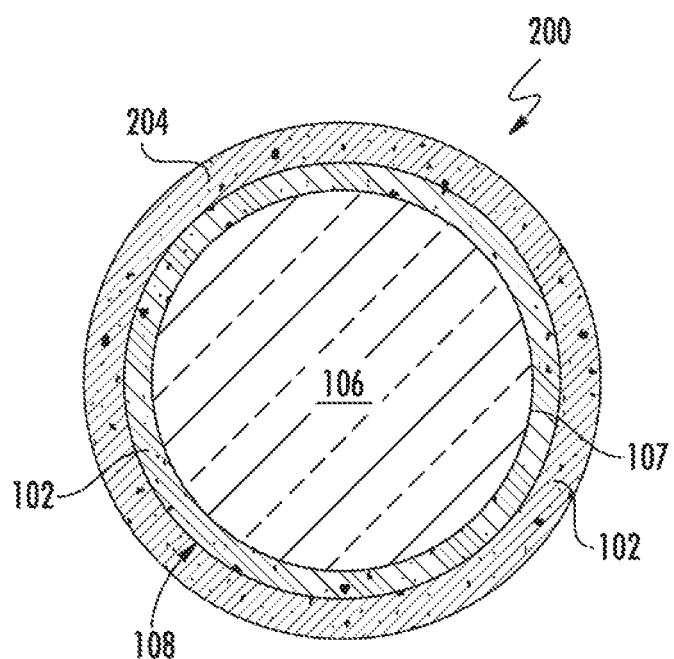
FIG. 5 is a cross sectional view of a coated proppant containing a chemical treatment agent dispersed within a coating in accordance with several exemplary embodiments described herein.

FIG. 5 is a cross sectional view of a coated proppant 200 containing the chemical treatment agent 102 dispersed within a coating 204 in accordance with one or more embodiments. The chemical treatment agent 102 can be homogenously or substantially homogeneously dispersed throughout the coating 204. The coating 204 can contain the chemical treatment agent 102 in any suitable amounts. For example, the coating 204 can have a chemical treatment agent 102 concentration of about at least about 0.01 wt %, at least about 0.1 wt %, at least about 0.5 wt %, at least about 1 wt %, at least about 2 wt %, at least about 4 wt %, at least about 6 wt %, or at least about 10 wt % based on the weight of the coating 104. The coating 204 can include any suitable resin material and/or epoxy resin material as disclosed herein. The coating 204 can be degradable or non-degradable.

In one or more exemplary embodiments, the layer 108 of chemical treatment agent 102 can be formed between the coating 204 and the proppant particulate 106. For example, the layer 108 of chemical treatment agent 102 can surround and/or be deposited on an outer surface 107 of the proppant particulate 106 in any suitable manner as disclosed in reference to FIG. 4 above. The coated proppant 200 can contain the chemical treatment agent 102 in any suitable amounts. According to several exemplary embodiments, the coated proppant 200 contains at least about 0.01 wt %, at least about 0.1 wt %, at least about 0.5 wt %, at least about 1 wt %, at least about 2 wt %, at least about 4 wt %, at least about 6 wt %, or at least about 10 wt % chemical treatment agent 102 based on the total weight of the coated proppant 200. The coated proppant 200 can contain the resin material in any suitable amounts. According to several exemplary embodiments, the coated proppant 200 contains about 0.01 wt %, about 0.2 wt %, about 0.8 wt %, about 1.5 wt %, about 2.5 wt %, about 3.5 wt %, or about 5 wt % to about 8 wt %, about 15 wt %, about 30 wt %, about 50 wt %, or about 80 wt % resin material, based on the total weight of the coated proppant 200.

Figure 6:
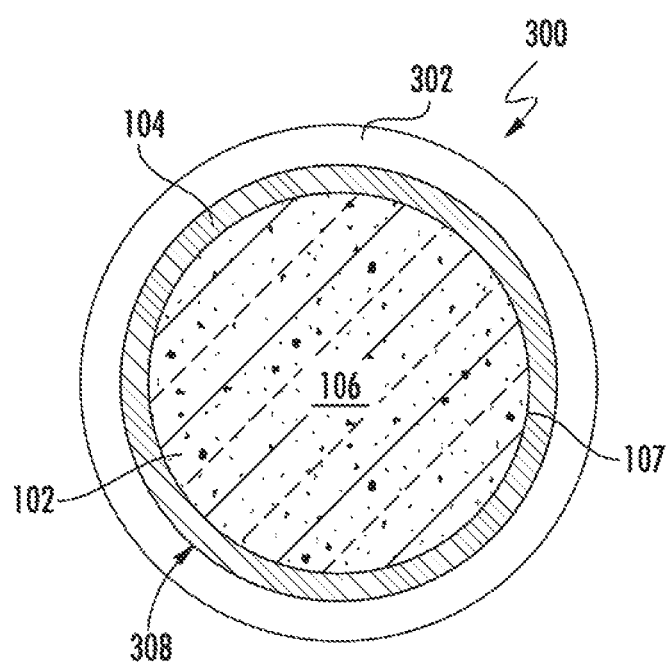
FIG. 6 is a cross sectional view of an encapsulated proppant having a degradable, non-permeable shell encapsulating a coated proppant, the coated proppant containing a chemical treatment agent infused into a porous proppant particulate in accordance with several exemplary embodiments described herein.

FIG. 6 is a cross sectional view of an encapsulated proppant 300 having a degradable, non-permeable shell 302 encapsulating a coated proppant, the coated proppant including the chemical treatment agent 102 infused into a porous proppant particulate 106 and surrounded by the resin coating 104. The resin coating 104 can be coated onto the porous proppant particulate 106. The degradable shell 302 can be directly or indirectly coated onto an outer surface 308 of the resin coating 104. The degradable shell 302 can coat or cover at least about 10%, at least about 30%, at least about 50%, at least about 70%, at least about 90%, at least about 95%, or at least about 99% of the entire outer surface area of the coated proppant. For example, the degradable shell 302 can coat or cover about 100% of the entire outer surface area of the coated proppant. The degradable shell 302 can coat or cover at least about 10%, at least about 30%, at least about 50%, at least about 70%, at least about 90%, at least about 95%, or at least about 99% of the entire outer surface 308 of the resin coating 104. For example, the coating can coat or cover about 100% of the entire outer surface area of the coated proppant such that the resin coating 104 is disposed between the porous proppant particulate 106 and the degradable shell 302.

The encapsulated proppant 300 can contain the chemical treatment agent 102 in any suitable amounts. According to several exemplary embodiments, the encapsulated proppant 300 contains at least about 0.01 wt %, at least about 0.1 wt %, at least about 0.5 wt %, at least about 1 wt %, at least about 2 wt %, at least about 4 wt %, at least about 6 wt %, or at least about 10 wt % chemical treatment agent 102 based on the total weight of the encapsulated proppant 300. The encapsulated proppant 300 can contain the resin coating 104 in any suitable amounts. According to several exemplary embodiments, the encapsulated proppant 300 contains about 0.01 wt %, about 0.2 wt %, about 0.8 wt %, about 1.5 wt %, about 2.5 wt %, about 3.5 wt %, or about 5 wt % to about 8 wt %, about 15 wt %, about 30 wt %, about 50 wt %, or about 80 wt % resin material, based on the total weight of the encapsulated proppant 300.

Figure 7:
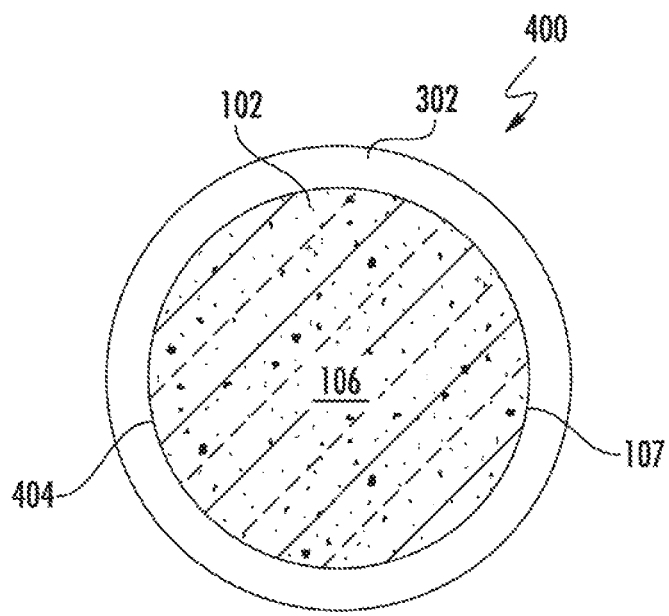
FIG. 7 is a cross sectional view of an encapsulated proppant having a degradable, non-permeable shell encapsulating an uncoated proppant, the uncoated proppant containing a chemical treatment agent infused into a porous proppant particulate in accordance with several exemplary embodiments described herein.

The degradable shell 302 can also encapsulate any suitable configuration of proppant particulate. For example, FIG. 7 is a cross sectional view of an encapsulated proppant 400 having the degradable, non-permeable shell 302 encapsulating an uncoated proppant 404, the uncoated proppant 404 containing the chemical treatment agent 102 infused into a porous proppant particulate 106. The degradable shell 302 can be directly or indirectly coated onto an outer surface 107 of the porous proppant particulate 106. The degradable shell 302 can coat or cover at least about 10%, at least about 30%, at least about 50%, at least about 70%, at least about 90%, at least about 95%, or at least about 99% of the entire outer surface area of the porous proppant particulate 106. For example, the degradable shell 302 can coat or cover about 100% of the entire outer surface area of the uncoated proppant 404. The encapsulated proppant 400 can contain the chemical treatment agent 102 in any suitable amounts. According to several exemplary embodiments, the encapsulated proppant 400 contains at least about 0.01 wt %, at least about 0.1 wt %, at least about 0.5 wt %, at least about 1 wt %, at least about 2 wt %, at least about 4 wt %, at least about 6 wt %, or at least about 10 wt % chemical treatment agent 102 based on the total weight of the encapsulated proppant 400.

Figure 8:
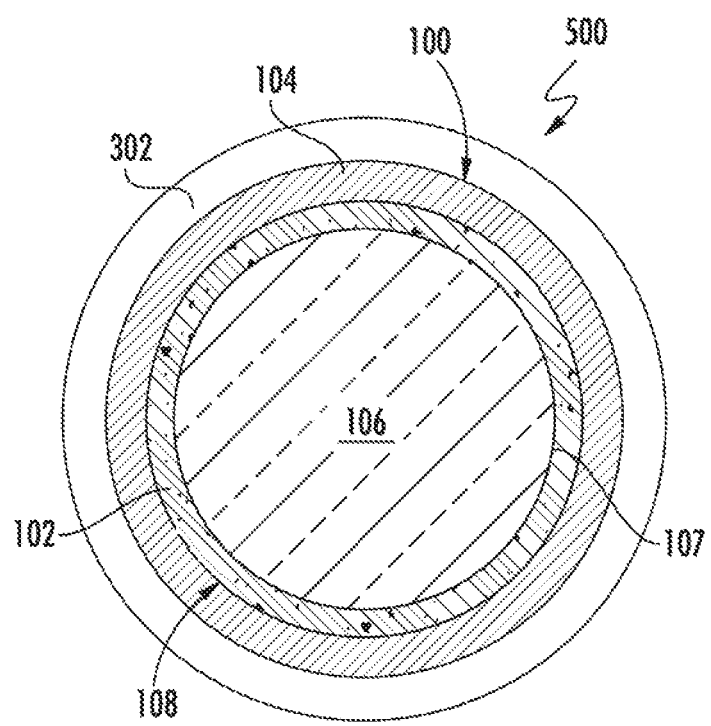
FIG. 8 is a cross sectional view of an encapsulated proppant having a degradable, non-permeable shell encapsulating a coated proppant, the coated proppant containing a chemical treatment agent disposed between a resin coating and a proppant particulate in accordance with several exemplary embodiments described herein.

FIG. 8 is a cross sectional view of an encapsulated proppant 500 having the degradable, non-permeable shell 302 encapsulating the coated proppant 100 discussed above. For example, the degradable shell 302 can be directly or indirectly coated onto an outer surface of the resin coating 104 of the coated proppant 100. The degradable shell 302 can coat or cover at least about 10%, at least about 30%, at least about 50%, at least about 70%, at least about 90%, at least about 95%, or at least about 99% of the entire outer surface area of the resin coating 104 of the coated proppant 100. For example, the degradable shell 302 can coat or cover about 100% of the entire outer surface area of the resin coating 104. The degradable shell 302 can also cover, surround, and/or encapsulate the coated proppant 200.

According to several exemplary embodiments, the degradable shell 302 is present in the encapsulated proppant 300, 400, 500 in any suitable amount. According to several exemplary embodiments, the encapsulated proppant 300, 400, 500 contains at least about 0.01 wt %, at least about 0.1 wt %, at least about 0.5 wt %, at least about 1 wt %, at least about 2 wt %, at least about 4 wt %, at least about 6 wt %, or at least about 10 wt % degradable shell 302 based on the total weight of the encapsulated proppant 300, 400, 500. According to several exemplary embodiments, the encapsulated proppant 300, 400, 500 contains about 0.01 wt %, about 0.2 wt %, about 0.8 wt %, about 1.5 wt %, about 2.5 wt %, about 3.5 wt %, or about 5 wt % to about 8 wt %, about 15 wt %, about 30 wt %, about 50 wt %, or about 80 wt % degradable shell 302, based on the total weight of the encapsulated proppant 300, 400, 500.

According to several exemplary embodiments, the chemical treatment agent 102 is present in the encapsulated proppant 300, 400, 500 in any suitable amount. According to several exemplary embodiments, the encapsulated proppant 300, 400, 500 contains at least about 0.01 wt %, at least about 0.1 wt %, at least about 0.5 wt %, at least about 1 wt %, at least about 2 wt %, at least about 4 wt %, at least about 6 wt %, or at least about 10 wt % chemical treatment agent 102 based on the total weight of the encapsulated proppant 300, 400, 500. According to several exemplary embodiments, the encapsulated proppant 300, 400, 500 contains about 0.01 wt %, about 0.2 wt %, about 0.8 wt %, about 1.5 wt %, about 2.5 wt %, or about 3.5 wt % to about 5 wt %, about 8 wt %, about 12 wt %, or about 20 wt % chemical treatment agent 102, based on the total weight of the coated proppant 300, 400, 500.

The degradable shell 302 of the encapsulated proppant 300, 400, 500 can have any suitable thickness. The degradable shell 302 can have thickness of at least about 0.1 nm, at least about 0.5 nm, at least about 1 nm, at least about 4 nm, at least about 8 nm, at least about 15 nm, at least about 30 nm, at least about 60 nm, at least about 100 nm, at least about 200 nm, or at least about 500 nm. For example, the degradable shell 302 can have thickness from about 1 nm, about 10 nm, about 20 nm, about 50 nm, about 100 nm, about 150 nm, or about 200 nm to about 300 nm, about 500 nm, about 750 nm, or about 1,000 nm or more.

In one or more exemplary embodiments, the proppant particulate 106 can be or include natural sand. In one or more exemplary embodiments, the proppant particulate 106 can be or include ceramic proppant. The ceramic proppant can be or include porous ceramic proppant and non-porous ceramic proppant.

The proppant particulates 106 can be or include silica and/or alumina in any suitable amounts. According to several exemplary embodiments, the proppant particulate 106 include less than 80 wt %, less than 60 wt %, less than 40 wt %, less than 30 wt %, less than 20 wt %, less than 10 wt %, or less than 5 wt % silica based on the total weight of the proppant particulates 106, 206. According to several exemplary embodiments, the proppant particulate 106 include from about 0.1 wt % to about 70 wt % silica, from about 1 wt % to about 60 wt % silica, from about 2.5 wt % to about 50 wt % silica, from about 5 wt % to about 40 wt % silica, or from about 10 wt % to about 30 wt % silica. According to several exemplary embodiments, the proppant particulate 106 include at least about 30 wt %, at least about 50 wt %, at least about 60 wt %, at least about 70 wt %, at least about 80 wt %, at least about 90 wt %, or at least about 95 wt % alumina based on the total weight of the proppant particulate 106. According to several exemplary embodiments, the proppant particulate includes from about 30 wt % to about 99.9 wt % alumina, from about 40 wt % to about 99 wt % alumina, from about 50 wt % to about 97 wt % alumina, from about 60 wt % to about 95 wt % alumina, or from about 70 wt % to about 90 wt % alumina.

According to several exemplary embodiments, the proppant compositions disclosed herein include proppant particulates 106 that are substantially round and spherical having a size in a range between about 6 and 270 U.S. Mesh. For example, the size of the particulate 106 can be expressed as a grain fineness number (GFN) in a range of from about 15 to about 300, or from about 30 to about 110, or from about 40 to about 70. According to such examples, a sample of sintered particles can be screened in a laboratory for separation by size, for example, intermediate sizes between 20, 30, 40, 50, 70, 100, 140, 200, and 270 U.S. mesh sizes to determine GFN. The correlation between sieve size and GFN can be determined according to Procedure 106-87-S of the American Foundry Society Mold and Core Test Handbook, which is known to those of ordinary skill in the art.

The proppant compositions disclosed herein include proppant particulates having any suitable size. For example, the proppant particulate 106 can have a mesh size of at least about 6 mesh, at least about 10 mesh, at least about 16 mesh, at least about 20 mesh, at least about 25 mesh, at least about 30 mesh, at least about 35 mesh, or at least about 40 mesh. According to several exemplary embodiments, the proppant particulate 106 has a mesh size from about 6 mesh, about 10 mesh, about 16 mesh, or about 20 mesh to about 25 mesh, about 30 mesh, about 35 mesh, about 40 mesh, about 45 mesh, about 50 mesh, about 70 mesh, or about 100 mesh. According to several exemplary embodiments, the proppant particulate 106 has a mesh size from about 4 mesh to about 120 mesh, from about 10 mesh to about 60 mesh, from about 16 mesh to about 20 mesh, from about 20 mesh to about 40 mesh, or from about 25 mesh to about 35 mesh.

According to several exemplary embodiments, the proppant compositions disclosed herein include porous and/or non-porous proppant particulates having any suitable permeability and conductivity in accordance with ISO 13503-5: "Procedures for Measuring the Long-term Conductivity of Proppants," and expressed in terms of Darcy units, or Darcies (D). A pack of the proppant particulate 106, having a 20/40 mesh size range, can have a long term permeability at 7,500 psi of at least about 1 D, at least about 2 D, at least about 5 D, at least about 10 D, at least about 20 D, at least about 40 D, at least about 80 D, at least about 120 D, at least about 150 D, at least about 200 D, or at least about 250 D. The pack of the proppant particulate 106, having a 20/40 mesh size range, can have a long term permeability at 12,000 psi of at least about 1 D, at least about 2 D, at least about 3 D, at least about 4 D, at least about 5 D, at least about 10 D, at least about 25 D, at least about 50 D, at least about 100 D, at least about 150 D, or at least about 200 D. The pack of the proppant particulate 106, having a 20/40 mesh size range, can have a long term permeability at 15,000 psi of at least about 1 D, at least about 2 D, at least about 3 D, at least about 4 D, at least about 5 D, at least about 10 D, at least about 25 D, at least about 50 D, at least about 75 D, at least about 100 D, or at least about 150 D. The pack of the proppant particulate 106, having a 20/40 mesh size range, can have a long term permeability at 20,000 psi of at least about 1 D, at least about 2 D, at least about 3 D, at least about 4 D, at least about 5 D, at least about 10 D, at least about 25 D, at least about 50 D, at least about 75 D, or at least about 100 D.

A pack of the proppant particulate 106 can have a long term conductivity at 7,500 psi of at least about 100 millidarcy-feet (mD-ft), at least about 200 mD-ft, at least about 300 mD-ft, at least about 500 mD-ft, at least about 1,000 mD-ft, at least about 1,500 mD-ft, at least about 2,000 mD-ft, or at least about 2,500 mD-ft. For example, a pack of the proppant particulate 106 can have a long term conductivity at 12,000 psi of at least about 50 mD-ft, at least about 100 mD-ft, at least about 200 mD-ft, at least about 300 mD-ft, at least about 500 mD-ft, at least about 1,000 mD-ft, or at least about 1,500 mD-ft.

The proppant compositions disclosed herein include proppant particulates 106 having any suitable shape. The proppant particulate 106 can be substantially round, cylindrical, square, rectangular, elliptical, oval, egg-shaped, or pill-shaped. As shown, the proppant particulate 106 can be substantially round and spherical. According to several exemplary embodiments, the proppant particulates 106 of the proppant compositions disclosed herein have an apparent specific gravity of less than 3.1 g/cm$^3$, less than 3.0 g/cm$^3$, less than 2.8 g/cm$^3$, or less than 2.5 g/cm$^3$. According to several exemplary embodiments, the proppant particulate 106 has an apparent specific gravity of from about 3.1 to 3.4 g/cm$^3$, from about 1.5 to about 2.2 g/cm$^3$, from about 1.9 to about 2.5 g/cm$^3$, or from about 2.6 to about 3.2 g/cm$^3$. According to several exemplary embodiments, the proppant particulate 106 has an apparent specific gravity of greater than 3.4 g/cm$^3$, greater than 3.6 g/cm$^3$, greater than 4.0 g/cm$^3$, or greater than 4.5 g/cm$^3$.

The proppant particulate 106 can have any suitable specific gravity. The proppant particulate 106 can have a specific gravity of at least about 2.5, at least about 2.7, at least about 3, at least about 3.3, or at least about 3.5. For example, the proppant particulate 106 can have a specific gravity of about 2.5 to about 4.0, about 2.7 to about 3.8, about 3.5 to about 4.2, about 3.8 to about 4.4, or about 3.0 to about 3.5. In one or more exemplary embodiments, the proppant particulate 106 can have a specific gravity of less than 4 g/cc, less than 3.5 g/cc, less than 3 g/cc, less than 2.75 g/cc, less than 2.5 g/cc, less than 2.25 g/cc, less than 2 g/cc, less than 1.75 g/cc, or less than 1.5 g/cc. For example, the proppant particulate 106 can have a specific gravity of about 1.3 g/cc to about 3.5 g/cc, about 1.5 g/cc to about 3.2 g/cc, about 1.7 g/cc to about 2.7 g/cc, about 1.8 g/cc to about 2.4 g/cc, or about 2.0 g/cc to about 2.3 g/cc.

The proppant particulate 106 can have any suitable bulk density. In one or more exemplary embodiments, the proppant particulate 106 have a bulk density of less than 3 g/cc, less than 2.5 g/cc, less than 2.2 g/cc, less than 2 g/cc, less than 1.8 g/cc, less than 1.6 g/cc, or less than 1.5 g/cc. The proppant particulate 106 can have a bulk density of about 1 g/cc, about 1.15 g/cc, about 1.25 g/cc, about 1.35 g/cc, or about 1.45 g/cc to about 1.5 g/cc, about 1.6 g/cc, about 1.75 g/cc, about 1.9 g/cc, or about 2.1 g/cc or more. For example, the proppant particulate 106 can have a bulk density of about 1.3 g/cc to about 1.8 g/cc, about 1.35 g/cc to about 1.65 g/cc, or about 1.5 g/cc to about 1.9 g/cc.

The proppant particulate 106 can have any suitable surface roughness. The proppant particulate 106 can have a surface roughness of less than 5 μm, less than 4 μm, less than 3 μm, less than 2.5 μm, less than 2 μm, less than 1.5 μm, or less than 1 μm. For example, the proppant particulate 106 can have a surface roughness of about 0.1 μm to about 4.5 μm, about 0.4 μm to about 3.5 μm, or about 0.8 μm to about 2.8 μm.

The proppant particulate 106 can have any suitable pore size distribution. For example, the proppant particulate 106 can have a standard deviation in pore size of less than 6 μm, less than 4 μm, less than 3 μm, less than 2.5 μm, less than 2 μm, less than 1.5 μm, or less than 1 μm. The proppant particulate 106 can have any suitable average maximum or largest pore size. For example, the proppant particulate 106 can have an average largest pore size of less than about 25 μm, less than about 20 μm, less than about 18 μm, less than about 16 μm, less than about 14 μm, or less than about 12 μm. The proppant particulate 106 can have any suitable concentration of pores. For example, the proppant particulate 106 can have less than 5,000, less than 4,500, less than 4,000, less than 3,500, less than 3,000, less than 2,500, or less than 2,200 visible pores at a magnification of 500× per square millimeter of the proppant particulate 106.

The proppant particulate 106 can have any suitable porosity. According to several exemplary embodiments, the proppant particulate 106 can be or include porous ceramic proppant having any suitable porosity. The proppant particulate 106 can have an internal interconnected porosity from about 1%, about 2%, about 4%, about 6%, about 8%, about 10%, about 12%, or about 14% to about 18%, about 20%, about 22%, about 24%, about 26%, about 28%, about 30%, about 34%, about 38%, about 45%, about 55%, about 65%, or about 75% or more. In several exemplary embodiments, the internal interconnected porosity of the proppant particulate 106 is from about 5% to about 75%, about 5% to about 15%, about 10% to about 30%, about 15% to about 35%, about 25% to about 45%, about 30% to about 55%, or about 35% to about 70%. In one or more exemplary embodiments, the proppant particulate 106 can have a porosity of at least about 5%, at least about 10%, at least about 15%, at least about 20%, at least about 25%, at least about 30%, at least about 40%, or at least about 50% or more.

According to several exemplary embodiments, the proppant particulate 106 can have any suitable average pore size.

For example, the proppant particulate 106 can have an average pore size from about 2 nm, about 10 nm, about 15 nm, about 55 nm, about 110 nm, about 520 nm, or about 1,100 to about 2,200 nm, about 5,500 nm, about 11,000 nm, about 17,000 nm, or about 25,000 nm or more in its largest dimension. For example, the proppant particulate 106 can have an average pore size can be from about 3 nm to about 30,000 nm, about 30 nm to about 18,000 nm, about 200 nm to about 9,000, about 350 nm to about 4,500 nm, or about 850 nm to about 1,800 nm in its largest dimension.

As discussed herein, the proppant particulates 106 can contain the chemical treatment agents 102 in any suitable manner. In one or more exemplary embodiments, the proppant particulates 106 are infused with, coated with, and/or encapsulated with the one or more chemical treatment agents 102. Suitable chemical treatment agents 102 can be or include any one or more of scale inhibitors, hydrate inhibitors, hydrogen sulfide scavenging materials, corrosion inhibitors, paraffin or wax inhibitors, including ethylene vinyl acetate copolymers, asphaltene inhibitors, organic deposition inhibitors, biocides, demulsifiers, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, nanoparticle dispersions, surfactants or combinations thereof. In one or more exemplary embodiments, the scale inhibitor can inhibit scales of calcium, barium, magnesium salts and the like, including barium sulfate, calcium sulfate, and calcium carbonate scales. The composites can further have applicability in the treatment of other inorganic scales, such as zinc sulfide, iron sulfide, etc. In one or more exemplary embodiments, the scale inhibitors are anionic scale inhibitors. The scale inhibitors can include strong acids such as a phosphonic acid, phosphoric acid, phosphorous acid, phosphate esters, phosphonate/phosphonic acids, aminopoly carboxylic acids, chelating agents, and polymeric inhibitors and salts thereof. The scale inhibitors can also include organo phosphonates, organo phosphates and phosphate esters as well as the corresponding acids and salts thereof. The scale inhibitors can also include polymeric scale inhibitors, such as polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamidomethyl propane sulfonate terpolymers (PMA/AMPS). In one or more exemplary embodiments, the scale inhibitors can include DTPA, (also known as diethylenetriaminepentaacetic acid; diethylenetriamine-N,N,N',N',N"-pentaacetic acid; pentetic acid; N,N-Bis(2-(bis-(carboxymethyl)amino) ethyl)-glycine; diethylenetriamine pentaacetic acid, [[(Carboxymethyl)imino]bis(ethylenenitrilo)]-tetra-acetic acid); EDTA: (also known as edetic acid; ethylenedinitrilotetraacetic acid; EDTA free base; EDTA free acid; ethylenediamine-N,N,N',N'-tetraacetic acid; hampene; Versene; N,N'-1,2-ethane diylbis-(N-(carboxymefhyl)glycine); ethylenediamine tetra-acetic acid); NTA, (also known as N,N-bis(carboxymethyl)glycine; triglycollamic acid; trilone A; alpha,alpha',alpha"-trimethylaminetricarboxylic acid; tri (carboxymethyl)amine; aminotriacetic acid; Hampshire NTA acid; nitrilo-2,2',2"-triacetic acid; titriplex i; nitrilotri-acetic acid); APCA (aminopolycarboxylic acids); phosphonic acids; EDTMP (ethylenediaminetetramethylene-phosphonic acid); DTPMP (diethylene triaminepentamethylenephosphonic acid); NTMP (nitrilotrimethylenephosphonic acid); polycarboxylic acids, gluconates, citrates, polyacrylates, and polyaspartates or any combination thereof. The scale inhibitors can also include any of the ACCENT™ scale inhibitors, commercially available from The Dow Chemical Company. The scale inhibitors can also include potassium salts of maleic acid copolymers. In one or more exemplary embodiments, the chemical treatment agent 102 is DTPMP.

In one or more exemplary embodiments, the chemical treatment agent 102 can be or include any one or more salt inhibitors. In one or more exemplary embodiments, the salt inhibitor can include any suitable salt inhibitor, including, but not limited to Na-Minus®, Na-Minus®-55, and WFT 9725, each commercially available from Weatherford International Ltd., Desalt Liquid salt inhibitor commercially available from JACAM Chemicals, LLC, and potassium ferricyanide and any combination thereof.

In one or more exemplary embodiments, the chemical treatment agent 102 can be or include any one or more demulsifying agents. The demulsifying agents can include, but are not limited to, condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of same. The demulsifying agents can also include oxyalkylated phenol formaldehyde resins, oxyalkylated amines and polyamines, di-epoxidized oxyalkylated polyethers, poly triethanolamine methyl chloride quaternary, melamine acid colloid, and aminomethylated polyacrylamide.

In one or more exemplary embodiments, the chemical treatment agent 102 can be or include any one or more corrosion inhibitors. Suitable corrosion inhibitors can include, but are not limited to, fatty imidazolines, alkyl pyridines, alkyl pyridine quaternaries, fatty amine quaternaries and phosphate salts of fatty imidazolines. In one or more exemplary embodiments, the chemical treatment agent 102 can be or include any one or more suitable foaming agents. Suitable foaming agents can include, but are not limited to, oxyalkylated sulfates or ethoxylated alcohol sulfates, or mixtures thereof. In one or more exemplary embodiments, the chemical treatment agent 102 can be or include any one or more suitable oxygen scavengers. Suitable oxygen scavengers can include triazines, maleimides, formaldehydes, amines, carboxamides, alkylcarboxyl-azo compounds cumine-peroxide compounds morpholino and amino derivatives morpholine and piperazine derivatives, amine oxides, alkanolamines, aliphatic and aromatic polyamines.

In one or more exemplary embodiments, the chemical treatment agent 102 can be or include any one or more paraffin inhibitors. Suitable paraffin inhibitors can include, but are not limited to, ethylene/vinyl acetate copolymers, acrylates (such as polyacrylate esters and methacrylate esters of fatty alcohols), and olefin/maleic esters. In one or more exemplary embodiments, the chemical treatment agent 102 can be or include any one or more asphaltene inhibitors. Suitable asphaltene inhibitors can include, but are not limited to, asphaltene treating chemicals include but are not limited to fatty ester homopolymers and copolymers (such as fatty esters of acrylic and methacrylic acid polymers and copolymers) and sorbitan monooleate.

According to several exemplary embodiments, the coating 104, 204 can be or include a resin material and/or an epoxy resin material. The coating 104, 204 can include any suitable resin material and/or epoxy resin material. According to several exemplary embodiments, the resin material includes any suitable resin. For example, the resin material can include a phenolic resin, such as a phenol-formaldehyde resin. According to several exemplary embodiments, the phenol-formaldehyde resin has a molar ratio of formaldehyde to phenol (F:P) from a low of about 0.6:1, about 0.9:1, or about 1.2:1 to a high of about 1.9:1, about 2.1:1, about 2.3:1, or about 2.8:1. For example, the phenol-formaldehyde resin can have a molar ratio of formaldehyde to phenol of about 0.7:1 to about 2.7:1, about 0.8:1 to about 2.5:1, about 1:1 to about 2.4:1, about 1.1:1 to about 2.6:1, or about 1.3:1 to about 2:1. The phenol-formaldehyde resin can also have a molar ratio of formaldehyde to phenol of about 0.8:1 to about 0.9:1, about 0.9:1 to about 1:1, about 1:1 to about 1.1:1, about 1.1:1 to about 1.2:1, about 1.2:1 to about 1.3:1, or about 1.3:1 to about 1.4:1.

According to several exemplary embodiments, the phenol-formaldehyde resin has a molar ratio of less than 1:1, less than 0.9:1, less than 0.8:1, less than 0.7:1, less than 0.6:1, or less than 0.5:1. For example, the phenol-formaldehyde resin can be or include a phenolic novolac resin. Phenolic novolac resins are well known to those of ordinary skill in the art, for instance see U.S. Pat. No. 2,675,335 to Rankin, U.S. Pat. No. 4,179,429 to Hanauye, U.S. Pat. No. 5,218,038 to Johnson, and U.S. Pat. No. 8,399,597 to Pullichola, the entire disclosures of which are incorporated herein by reference. Suitable examples of commercially available novolac resins include novolac resins available from Plenco™, Durite® resins available from Momentive, and novolac resins available from S.I. Group.

According to several exemplary embodiments, the phenol-formaldehyde resin has a weight average molecular weight from a low of about 200, about 300, or about 400 to a high of about 1,000, about 2,000, or about 6,000. For example, the phenol-formaldehyde resin can have a weight average molecular weight from about 250 to about 450, about 450 to about 550, about 550 to about 950, about 950 to about 1,500, about 1,500 to about 3,500, or about 3,500 to about 6,000. The phenol-formaldehyde resin can also have a weight average molecular weight of about 175 to about 800, about 700 to about 3,330, about 1,100 to about 4,200, about 230 to about 550, about 425 to about 875, or about 2,750 to about 4,500.

According to several exemplary embodiments, the phenol-formaldehyde resin has a number average molecular weight from a low of about 200, about 300, or about 400 to a high of about 1,000, about 2,000, or about 6,000. For example, the phenol-formaldehyde resin can have a number average molecular weight from about 250 to about 450, about 450 to about 550, about 550 to about 950, about 950 to about 1,500, about 1,500 to about 3,500, or about 3,500 to about 6,000. The phenol-formaldehyde resin can also have a number average molecular weight of about 175 to about 800, about 700 to about 3,000, about 1,100 to about 2,200, about 230 to about 550, about 425 to about 875, or about 2,000 to about 2,750.

According to several exemplary embodiments, the phenol-formaldehyde resin has a z-average molecular weight from a low of about 200, about 300, or about 400 to a high of about 1,000, about 2,000, or about 9,000. For example, the phenol-formaldehyde resin can have a z-average molecular weight from about 250 to about 450, about 450 to about 550, about 550 to about 950, about 950 to about 1,500, about 1,500 to about 3,500, about 3,500 to about 6,500, or about 6,500 to about 9,000. The phenol-formaldehyde resin can also have a z-average molecular weight of about 175 to about 800, about 700 to about 3,330, about 1,100 to about 4,200, about 230 to about 550, about 425 to about 875, or about 4,750 to about 8,500.

According to several exemplary embodiments, the phenol-formaldehyde resin has any suitable viscosity. The phenol-formaldehyde resin can be a solid or liquid at 25° C. For example, the viscosity of the phenol-formaldehyde resin can be from about 1 centipoise (cP), about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the phenol-formaldehyde resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the phenol-formaldehyde resin can have a viscosity from about 1 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity of the phenol-formaldehyde resin can also be from about 500 cP, about 1,000 cP, about 2,500 cP, about 5,000 cP, or about 7,500 cP to about 10,000 cP, about 15,000 cP, about 20,000 cP, about 30,000 cP, or about 75,000 cP at a temperature of about 150° C. For example, the phenol-formaldehyde resin can have a viscosity from about 750 cP to about 60,000 cP, about 1,000 cP to about 35,000 cP, about 4,000 cP to about 25,000 cP, about 8,000 cP to about 16,000 cP, or about 10,000 cP to about 12,000 cP at a temperature of about 150° C. The viscosity of the phenol-formaldehyde resin can be determined using a Brookfield viscometer.

According to several exemplary embodiments, the phenol-formaldehyde resin can have pH from a low of about 1, about 2, about 3, about 4, about 5, about 6, about 7 to a high of about 8, about 9, about 10, about 11, about 12, or about 13. For example, the phenol-formaldehyde resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

According to several exemplary embodiments of the present disclosure, the coating 104, 204 applied to the proppant particulates 106 is an epoxy resin. According to such embodiments, the coating 104, 204 can be or include any suitable epoxy resin. For example, the epoxy resin can include bisphenol A, bisphenol F, aliphatic, or glycidylamine epoxy resins, and any mixtures or combinations thereof. An example of a commercially available epoxy resin is BE188 Epoxy Resin, available from Chang Chun Plastics Co., Ltd.

According to several exemplary embodiments, the epoxy resin can have any suitable viscosity. The epoxy resin can be a solid or liquid at 25° C. For example, the viscosity of the epoxy resin can be from about 1 cP, about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the epoxy resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the epoxy resin can have a viscosity from about 1 cP to about 45 cP, about 45 cP to about 125 cP, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity of the epoxy resin can also be from about 500 cP, about 1,000 cP, about 2,500 cP, about 5,000 cP, or about 7,000 cP to about 10,000 cP, about 12,500 cP, about 15,000 cP, about 17,000 cP, or about 20,000 cP at a temperature of about 25° C. In another example, the epoxy resin can have a viscosity from about 1,000 cP to about 12,000 cP, about 2,000 cP to about 11,000 cP, about 4,000 cP to about 10,500 cP, or about 7,500 cP to about 9,500 cP at a temperature of about 25° C. The viscosity of the epoxy resin can also be from about 500 cP, about 1,000 cP, about 2,500 cP, about 5,000 cP, or about 7,500 cP to about 10,000 cP, about 15,000 cP, about 20,000 cP, about 30,000 cP, or about 75,000 cP at a temperature of about 150° C. For example, the epoxy resin can have a viscosity from about 750 cP to about 60,000 cP, about 1,000 cP to about 35,000 cP, about 4,000 cP to about 25,000 cP, about 8,000 cP to about 16,000 cP, or about 10,000 cP to about 12,000 cP at a temperature of about 150° C.

According to several exemplary embodiments, the epoxy resin can have pH from a low of about 1, about 2, about 3, about 4, about 5, about 6, about 7 to a high of about 8, about 9, about 10, about 11, about 12, or about 13. For example, the epoxy resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

Methods for coating proppant particulates with resins and/or epoxy resins are well known to those of ordinary skill in the art, for instance see U.S. Pat. No. 2,378,817 to Wrightsman, U.S. Pat. No. 4,873,145 to Okada and U.S. Pat. No. 4,888,240 to Graham, the entire disclosures of which are incorporated herein by reference.

According to one or more exemplary embodiments, the chemical treatment agent 102 is mixed with or otherwise added to the resin coating 104, 204 prior to coating the proppant particulates 106 with the resin coating 104, 204. For example, the chemical treatment agent 102 can be homogenously mixed with the coating 104, 204 prior to coating the proppant particulates 106 with the coating 104, 204.

According to one or more exemplary embodiments, the proppant particulates 106 are porous ceramic particulates infused with one or more chemical treatment agents 102. Methods for infusing porous ceramic particulates with chemical treatment agents are well known to those of ordinary skill in the art, such as those disclosed in U.S. Pat. Nos. 5,964,291 and 7,598,209, the entire disclosures of which are incorporated herein by reference.

According to several exemplary embodiments, the coating 104, 204 can be or include a degradable coating. Specifically, as the coating degrades, the chemical treatment agent 102 mixed with the coating 104, 204, disposed between the coating 104, 204 and the proppant particulate 106, and/or infused in the proppant particulate 106 can be released into the liquid(s) flowing through the cartridge 1002. The amount and molecular weight of the degradable coating 104, 204 can be varied to provide for longer or shorter degrade times and tailored release of the chemical treatment agent 102.

According to certain embodiments, the degradable coating 104, 204 can include one or more of water-soluble polymers and cross-linkable water-soluble polymers. Suitable water-soluble polymers and cross-linkable water-soluble polymers are disclosed in U.S. Pat. No. 6,279,656, the entire disclosure of which is incorporated herein by reference. According to several exemplary embodiments in which the degradable coating 104, 204 includes one or more of water-soluble polymers and cross-linkable water-soluble polymers, the solubility parameters of such polymers can be controlled to adjust the timing of the solubility or degradation of the coating 104, 204. Such parameters can include molecular weight, the hydrophilic/lipophilic balance of the polymers, and the extent of cross-linking of the polymers. According to several exemplary embodiments, the degradable coating 104, 204 includes a degradable polymer such as polylactic acid, cellulose acetate, methyl cellulose or combinations thereof that can degrade upon contact with fluids, over time, to allow for the release of the infused chemical treatment agent 102 at different time intervals.

According to one or more exemplary embodiments, the degradable coating 104, 204 can degrade in any suitable manner. For example, the degradable coating 204 can degrade from the outside-in, such that the outer surface of the coating 204 degrades first, resulting in controlled release of chemical treatment agent 102 blended with the coating 204. These degradable coating coatings 204 can include self-polishing coatings. The self-polishing coatings can include self-polishing copolymers having chemical bonds that are gradually hydrolyzed by water, such as produced water, seawater, and/or saltwater. The self-polishing coating can release chemical treatment agents 102 gradually, over time, due to the nature of the degradation of the coating 204 from its outermost surface towards its innermost surface, the degradation caused by the coating being gradually hydrolyzed by water.

According to several exemplary embodiments, the proppant particulates 106 can be coated with a polymeric material that forms a semi-permeable polymeric coating 104, 204 that is substantially non-degradable in the presence of fluid but permits the chemical treatment agent to leach, elute, diffuse, bleed, discharge, desorb, dissolve, drain, seep, and leak through the polymeric coating so as to release the chemical treatment agent 102 into the fluid flowing through the cartridge 1004. The amount and molecular weight of the semi-permeable substantially non-degradable polymeric coating 104, 204 can be varied to provide for longer or shorter release times for tailored release of the chemical treatment agents 102. According to several exemplary embodiments, the proppant particulates 106 are coated with a semi-permeable substantially non-degradable polymer such as phenol formaldehyde, polyurethane, cellulose ester, polyamides, vinyl esters, epoxies, or combinations thereof.

The degradable shell 302 can be or include any material suitable to prevent or eliminate separation or release of the chemical treatment agent(s) 106 from the encapsulated proppant 300, 400, 500 until the degradable shell 302 degrades or breaks down. For example, the degradable shell 102 can be impermeable or substantially impermeable to fluids until the degradable shell 302 degrades to a point that it becomes permeable to the surrounding fluid(s). Once the degradable shell 302 becomes fluid permeable, the chemical treatment agent(s) 106 can separate or elute from the encapsulated proppant 300, 400, 500.

The degradable shell 302 can be or include any water soluble and/or hydrocarbon soluble material. In one or more exemplary embodiments, the degradable shell 302 can be or include the encapsulation materials and/or sustained release compositions described in any one of U.S. Pre-Grant Publication Nos. 2003/0147821, 2005/0002996 and 2005/0129759, each incorporated by reference herein in its entirety. In one or more exemplary embodiments, the degradable shell 302 can be or include fatty alcohols that include, but are not limited to, behenyl alcohol, caprylic alcohol, cetyl alcohol, cetaryl alcohol, decyl alcohol, lauryl alcohol, isocetyl alcohol, myristyl alcohol, oleyl alcohol, stearyl alcohol, tallow alcohol, steareth-2, ceteth-1, ceteareth-3, and laureth-2. The degradable shell 302 can also be or include $C_8$-$C_{20}$ fatty acids that include, but are not limited to, stearic acid, capric acid, behenic acid, caprylic acid, lauric acid, myristic acid, tallow acid, oleic acid, palmitic acid, and isostearic acid. The degradable shell 302 can also be or include sorbitan derivatives that include, but are not limited to, PEG-10 sorbitan laurate, PEG-20 sorbitan isostearate, PEG-3 sorbitan oleate, polysorbate 40, sorbitan stearate, and sorbitan palmitate. The degradable shell 302 can also be or include one or more waxes that include, but are not limited to, mink wax, montan wax, carnauba wax, and candelilla wax, and synthetic waxes, such as silicone waxes. In one or more exemplary embodiments, the degradable shell 302 can be selected from polyoxymethylene urea (PMU), methoxymethyl methylol melamine (MMM), polysaccharides, collagens, gelatins, alginates, guar, guar gum, gum Arabic, and agar and any combination or mixture thereof. The degradable shell 302 can also be or include any suitable thermoplastic material. In one or more exemplary embodiments, the degradable shell 302 can be selected from polyvinyl alcohol, poly(acrylates and methacrylates), polylactic acid, polyamides, polyethylene, polypropylene, polystyrene, water-soluble polymers, and cross-linkable water-soluble polymers and any combination thereof.

In one or more exemplary embodiments, the degradable shell 302 can be a thermoplastic material that degrades at any suitable time and temperature. For example, the thermoplastic material can degrade at temperatures of at least about 5° C., at least about 10° C., at least about 20° C., at least about 30° C., at least about 50° C., at least about 70° C., or at least about 90° C. The thermoplastic material can also degrade at temperatures of less than 100° C., less than 95° C., less than 90° C., less than 80° C., or less than 70° C. The thermoplastic material can also degrade at temperatures of from about 1° C., about 4° C., about 8° C., about 12° C., about 16° C., about 25° C., about 35° C., about 45° C., or about 55° C. to about 75° C., about 85° C., about 95° C., about 105° C., about 120° C., about 150° C., or about 200° C. or more. In one or more exemplary embodiments, the thermoplastic material can degrade at temperatures of from about 1° C., about 4° C., about 8° C., about 12° C., about 16° C., about 25° C., about 35° C., about 45° C., or about 55° C. to about 75° C., about 85° C., about 95° C., about 105° C., about 120° C., about 150° C., or about 200° C. or more within a time period ranging from about 10 seconds, about 30 seconds, about 1 minute, about 2 minutes, about 5 minutes, about 10 minutes, about 30 minutes, about 1 hour, or about 2 hours to about 5 hours, about 10 hours, about 25 hours, about 50 hours, about 100 hours, about 500 hours, or about 1,000 hours or more.

According to one or more exemplary embodiments, the degradable shell 302 can degrade in any suitable manner. For example, the degradable shell 302 can degrade from the outside-in, such that the outer surface of the degradable shell 302 degrades first, resulting in controlled release of chemical treatment agent 106. The degradable shell 302 can also be a self-polishing coating as disclosed herein.

The degradable shell 302 can prevent the leaching, elution, diffusion, bleeding, discharging, desorption, dissolution, draining, seeping, or leaking of the chemical treatment agent 106 from the non-degraded encapsulated proppant, or encapsulated proppant particulates 300, 400, 500. According to one or more exemplary embodiments, the chemical treatment agents 106 can leach, elute, diffuse, bleed, discharge, desorb, dissolve, drain, seep, or leak from the encapsulated proppant particulates 300, 400, 500 at a rate of less than 10 ppm/(gram*day), less than 5 ppm/(gram*day), less than 2 ppm/(gram*day), less than 1 ppm/(gram*day), less than 0.5 ppm/(gram*day), less than 0.1 ppm/(gram*day), or less than 0.05 ppm/(gram*day) for at least about 1 hour, at least about 2 hours, at least about 6 hours, at least about 12 hours, at least about 1 day, or at least about 2 days after being in contact with liquid flowing through the cartridge 1002. According to one or more exemplary embodiments, the chemical treatment agent 106 can leach, elute, diffuse, bleed, discharge, desorb, dissolve, drain, seep, or leak from the encapsulated proppant particulates 300, 400, 500 at a rate of less than 10 ppm/(gram*day), less than 5 ppm/(gram*day), less than 2 ppm/(gram*day), less than 1 ppm/(gram*day), less than 0.5 ppm/(gram*day), less than 0.1 ppm/(gram*day), or less than 0.05 ppm/(gram*day) for at least about 1 hour, at least about 2 hours, at least about 6 hours, at least about 12 hours, at least about 1 day, or at least about 2 days after contacting a liquid. For example, the degradable shell 302 can limit the amount of leaching, elution, diffusion, bleeding, discharging, desorption, dissolution, draining, seeping, or leaking of the chemical treatment agent 106 from the encapsulated proppant particulates 300, 400, 500 to less than 10 ppm/gram, less than less than 5 ppm/gram, less than 1 ppm/gram, less than 0.5 ppm/gram, less than 0.1 ppm/gram, or less than less than 10 ppb/gram for about 10 seconds, about 30 seconds, about 1 minute, about 2 minutes, about 5 minutes, about 10 minutes, about 30 minutes, about 1 hour, or about 2 hours to about 5 hours, about 10 hours, about 25 hours, about 50 hours, about 100 hours, about 500 hours, or about 1,000 hours or more after being in contact with a liquid flowing through the cartridge 1002. For example, the degradable shell 302 can limit the amount of leaching, elution, diffusion, bleeding, discharging, desorption, dissolution, draining, seeping, or leaking of the chemical treatment agent 106 from the encapsulated proppant particulates 300, 400, 500 to less than 10 ppm/gram, less than less than 5 ppm/gram, less than 1 ppm/gram, less than 0.5 ppm/gram, less than 0.1 ppm/gram, or less than less than 10 ppb/gram for about 10 seconds, about 30 seconds, about 1 minute, about 2 minutes, about 5 minutes, about 10 minutes, about 30 minutes, about 1 hour, or about 2 hours to about 5 hours, about 10 hours, about 25 hours, about 50 hours, about 100 hours, about 500 hours, or about 1,000 hours or more after contacting the liquid flowing through the cartridge 1002.

According to several exemplary embodiments, the proppant particulates 106 can be coated or encapsulated with one or more water-soluble chemical treatment agents 102 such as a scale inhibitor, a salt inhibitor, or combinations or mixtures thereof, and then further coated or encapsulated with one or more hydrocarbon-soluble chemical treatment agents 102 such as a paraffin inhibitor or asphaltene inhibitor, to provide the coated proppant particulates 100, 200 and/or the encapsulated proppant particulates 300, 400, 500. The coating of hydrocarbon-soluble chemical treatment agents 102 can be mixed with or disposed or layered around the coating of water-soluble chemical treatment agents. According to such embodiments, the cartridge 1002 containing the coated proppant particulates 100, 200 and/or the encapsulated proppant particulates 300, 400, 500 is placed in production tubing and once hydrocarbon production begins, the presence of the hydrocarbons causes leaching, elution, diffusion, bleeding, discharging, desorbing, dissolving, draining, seeping, or leaking of the hydrocarbon-soluble chemical treatment agent 102 from the coated proppant particulates 100, 200 and/or the encapsulated proppant particulates 300, 400, 500. After a certain period of time, when water production begins, then the water-soluble chemical treatment agent 102 begins to leach, elute, diffuse, bleed, discharge, desorb, dissolve, drain, seep, or leak from the coated proppant particulates 100, 200 and/or the encapsulated proppant particulates 300, 400, 500.

According to several exemplary embodiments, the proppant particulates 106 can be coated or encapsulated with one or more hydrocarbon-soluble chemical treatment agents 102 such as a paraffin inhibitor or asphaltene inhibitor, and then further coated or encapsulated with one or more water-soluble chemical treatment agents 102 such as a scale inhibitor, a salt inhibitor, or combinations or mixtures thereof, to provide the coated proppant particulates 100, 200 and/or the encapsulated proppant particulates 300, 400, 500. The coating of water-soluble chemical treatment agents 102 can be mixed with or disposed or layered around the coating of the hydrocarbon-soluble chemical treatment agents 102. According to such embodiments, the cartridge 1002 containing the coated proppant particulates 100, 200 and/or the encapsulated proppant particulates 300, 400, 500 is placed in production tubing and once water production begins, the presence of water causes leaching, elution, diffusion, bleeding, discharging, desorbing, dissolving, draining, seeping, or leaking of the water-soluble chemical treatment agent 102 from the coated proppant particulates 100, 200 and/or the encapsulated proppant particulates 300, 400, 500. After a certain period of time, when hydrocarbon production begins, then the hydrocarbon-soluble chemical treatment agent 102 begins to leach, elute, diffuse, bleed, discharge, desorb, dissolve, drain, seep, or leak from the coated proppant particulates 100, 200 and/or the encapsulated proppant particulates 300, 400, 500.

According to several exemplary embodiments, the proppant particulates 106 are porous ceramic proppant particulates that can be infused with one or more water-soluble chemical treatment agents 102 such as a scale inhibitor, a salt inhibitor, or combinations or mixtures thereof, and then coated or encapsulated with one or more hydrocarbon-soluble chemical treatment agents 102 such as a paraffin inhibitor or asphaltene inhibitor, to provide the coated proppant particulates 100, 200 and/or the encapsulated proppant particulates 300, 400, 500. According to such embodiments, the cartridge 1002 containing the coated proppant particulates 100, 200 and/or the encapsulated proppant particulates 300, 400, 500 is placed in production tubing and once hydrocarbon production begins, the presence of the hydrocarbons causes leaching, elution, diffusion, bleeding, discharging, desorbing, dissolving, draining, seeping, or leaking of the hydrocarbon-soluble chemical treatment agent 102 from the coated proppant particulates 100, 200 and/or the encapsulated proppant particulates 300, 400, 500. After a certain period of time, when water production begins, then the water-soluble chemical treatment agent 102 begins to leach, elute, diffuse, bleed, discharge, desorb, dissolve, drain, seep, or leak from the coated proppant particulates 100, 200 and/or the encapsulated proppant particulates 300, 400, 500.

According to several exemplary embodiments, the proppant particulates 106 are porous ceramic proppant particulates that can be infused with one or more hydrocarbon-soluble chemical treatment agents 102 such as a paraffin inhibitor or asphaltene inhibitor, and then coated or encapsulated with one or more water-soluble chemical treatment agents 102 such as a scale inhibitor, a salt inhibitor, or combinations or mixtures thereof, to provide the coated proppant particulates 100, 200 and/or the encapsulated proppant particulates 300, 400, 500. According to such embodiments, the cartridge 1002 containing the coated proppant particulates 100, 200 and/or the encapsulated proppant particulates 300, 400, 500 is placed in production tubing and once water production begins, the presence of water causes leaching, elution, diffusion, bleeding, discharging, desorbing, dissolving, draining, seeping, or leaking of the water-soluble chemical treatment agent 102 from the coated proppant particulates 100, 200 and/or the encapsulated proppant particulates 300, 400, 500. After a certain period of time, when hydrocarbon production begins, then the hydrocarbon-soluble chemical treatment agent 102 begins to leach, elute, diffuse, bleed, discharge, desorb, dissolve, drain, seep, or leak from the coated proppant particulates 100, 200 and/or the encapsulated proppant particulates 300, 400, 500.

The chemical treatment agents 102 can leach, elute, diffuse, bleed, discharge, desorb, dissolve, drain, seep, or leak from the coated proppant particulates 100, 200 at any suitable rate. The chemical treatment agents 102 can also leach, elute, diffuse, bleed, discharge, desorb, dissolve, drain, seep, or leak from the encapsulated proppant particulates 300, 400, 500 at any suitable rate once the degradable shell 302 becomes fluid permeable. For example, the chemical treatment agents 102 can leach, elute, diffuse, bleed, discharge, desorb, dissolve, drain, seep, or leak from the coated proppant particulates 100, 200 and/or the encapsulated proppant particulates 300, 400, 500 at a rate of at least about 0.1 ppm/(gram*day), at least about 0.3 ppm/(gram*day), at least about 0.7 ppm/(gram*day), at least about 1.25 ppm/(gram*day), at least about 2 ppm/(gram*day), at least about 3 ppm/(gram*day), at least about 5 ppm/(gram*day), at least about 10 ppm/(gram*day), at least about 20 ppm/(gram*day), at least about 40 ppm/(gram*day), at least about 75 ppm/(gram*day), or at least about 100 ppm/(gram*day) for at least about 2 weeks, at least about 1 month, at least about 2 months, at least about 6 months, at least about 9 months, at least about 1 year, or at least about 2 years. For example, the chemical treatment agents can elute from the coated proppant particulates 100, 200 and/or the encapsulated proppant particulates 300, 400, 500 at a rate from about 0.01 ppm/(gram*day), about 0.05 ppm/(gram*day), about 0.1 ppm/(gram*day), about 0.5 ppm/(gram*day), about 1 ppm/(gram*day), about 1.5 ppm/(gram*day), about 2 ppm/(gram*day), or about 3 ppm/(gram*day) to about 4 ppm/(gram*day), about 4.5 ppm/(gram*day), about 5 ppm/(gram*day), about 6 ppm/(gram*day), about 7 ppm/(gram*day), about 8 ppm/(gram*day), about 10 ppm/(gram*day), about 15 ppm/(gram*day), about 30 ppm/(gram*day), about 75 ppm/(gram*day), or about 150 ppm/(gram*day) for at least about 2 weeks, at least about 1 month, at least about 2 months, at least about 6 months, at least about 9 months, at least about 1 year, or at least about 2 years.

According to one or more exemplary embodiments, the scale inhibitor can leach, elute, diffuse, bleed, discharge, desorb, dissolve, drain, seep, or leak from the coated proppant particulates 100, 200 and/or the encapsulated proppant particulates 300, 400, 500 at a rate of at least about 0.1 ppm/(gram*day), at least about 0.3 ppm/(gram*day), at least about 0.7 ppm/(gram*day), at least about 1.25 ppm/(gram*day), at least about 2 ppm/(gram*day), at least about 3 ppm/(gram*day), at least about 5 ppm/(gram*day), at least about 10 ppm/(gram*day), at least about 20 ppm/(gram*day), at least about 40 ppm/(gram*day), at least about 75 ppm/(gram*day), or at least about 100 ppm/(gram*day) for at least about 2 weeks, at least about 1 month, at least about 2 months, at least about 6 months, at least about 9 months, at least about 1 year, or at least about 2 years. For example, the scale inhibitor can elute from the coated proppant particulates 100, 200 and/or the encapsulated proppant particulates 300, 400, 500 at a rate from about 0.01 ppm/(gram*day), about 0.05 ppm/(gram*day), about 0.1 ppm/(gram*day), about 0.5 ppm/(gram*day), about 1 ppm/(gram*day), about 1.5 ppm/(gram*day), about 2 ppm/(gram*day), or about 3 ppm/(gram*day) to about 4 ppm/(gram*day), about 4.5 ppm/(gram*day), about 5 ppm/(gram*day), about 6 ppm/(gram*day), about 7 ppm/(gram*day), about 8 ppm/(gram*day), about 10 ppm/(gram*day), about 15 ppm/(gram*day), about 30 ppm/(gram*day), about 75 ppm/(gram*day), or about 150 ppm/(gram*day) for at least about 2 weeks, at least about 1 month, at least about 2 months, at least about 6 months, at least about 9 months, at least about 1 year, or at least about 2 years.

According to one or more exemplary embodiments, the paraffin inhibitor can leach, elute, diffuse, bleed, discharge, desorb, dissolve, drain, seep, or leak from the coated proppant particulates 100, 200 and/or the encapsulated proppant particulates 300, 400, 500 at a rate of at least about 0.1 ppm/(gram*day), at least about 0.3 ppm/(gram*day), at least about 0.7 ppm/(gram*day), at least about 1.25 ppm/(gram*day), at least about 2 ppm/(gram*day), at least about 3 ppm/(gram*day), at least about 5 ppm/(gram*day), at least about 10 ppm/(gram*day), at least about 20 ppm/(gram*day), at least about 40 ppm/(gram*day), at least about 75 ppm/(gram*day), or at least about 100 ppm/(gram*day) for at least about 2 weeks, at least about 1 month, at least about 2 months, at least about 6 months, at least about 9 months, at least about 1 year, or at least about 2 years. For example, the paraffin inhibitor can elute from the coated proppant particulates 100, 200 and/or the encapsulated proppant particulates 300, 400, 500 at a rate from about 0.01 ppm/(gram*day), about 0.05 ppm/(gram*day), about 0.1 ppm/(gram*day), about 0.5 ppm/(gram*day), about 1 ppm/(gram*day), about 1.5 ppm/(gram*day), about 2 ppm/(gram*day), or about 3 ppm/(gram*day) to about 4 ppm/(gram*day), about 4.5 ppm/(gram*day), about 5 ppm/(gram*day), about 6 ppm/(gram*day), about 7 ppm/(gram*day), about 8 ppm/(gram*day), about 10 ppm/(gram*day), about 15 ppm/(gram*day), about 30 ppm/(gram*day), about 75 ppm/(gram*day), or about 150 ppm/(gram*day) for at least about 2 weeks, at least about 1 month, at least about 2 months, at least about 6 months, at least about 9 months, at least about 1 year, or at least about 2 years.

According to several exemplary embodiments, the coated proppant particulates 100, 200 are prepared according to a two-step process. In the first step, a chemical treatment agent 102 is infused into the porous ceramic proppant particulates 106. In the second step, the infused porous ceramic proppant particulates 106 are coated with a semi-permeable substantially non-degradable polymer coating 104, 204. In several exemplary embodiments, the chemical treatment agent 102 is infused into the porous ceramic proppant particulates 106 by vacuum infusion. In other exemplary embodiments, the chemical treatment agent 102 is infused into the porous ceramic proppant particulates 106 using a thermal infusion process whereby the porous ceramic proppant particulates 106 are heated and wetted with a solution containing the chemical treatment agent 102. As the porous ceramic proppant particulates 106 cool, capillary action causes the chemical treatment agent 102 to infuse into the porous ceramic proppant particulates 106. In one or more exemplary embodiments, the chemical treatment agent 102 can be infused into the porous ceramic particulates 106 using a microwave infusion process. A suitable microwave infusion process is disclosed in U.S. Patent Application Publication No. 2016/0032177, which is incorporated by reference herein in its entirety.

According to several exemplary embodiments, the chemically infused coated porous ceramic proppant is prepared according to a one step process. According to the one step process, the porous ceramic proppant particulates 106 are infused with a chemical treatment agent 102 using the thermal infusion process described above and coated with a semi-permeable substantially non-degradable polymer coating 104, 204 before the resultant heat from the thermal infusion process dissipates.

According to several exemplary embodiments, the coated proppant particulates 100, 200 can be prepared according to any suitable process. For example, a chemical treatment agent 102 can be coated onto and/or contacted with a proppant particulate 106 to produce a chemical treatment agent containing proppant particulate. The chemical treatment agent containing proppant particulate can be coated with a semi-permeable substantially non-degradable polymer, a degradable polymer, and/or a self-polishing polymer 104, 204. In several exemplary embodiments, additional chemical treatment agent 102 can be mixed with the semi-permeable substantially non-degradable polymer, the degradable polymer, and/or the self-polishing polymer 104, 204 prior to, during, or after coating onto the proppant particulate 106. In other exemplary embodiments, the chemical treatment agent 102 is infused into any porous spaces of the proppant particulate 106 as disclosed herein prior to coating by the chemical treatment agent 102, the semi-permeable substantially non-degradable polymer, the degradable polymer, and/or the self-polishing polymer 104, 204. The coated proppant particulates 100, 200 can be prepared as disclosed herein without the use of a solvent.

According to several exemplary embodiments, the encapsulated proppant particulates 300, 400, 500 are prepared according to a three-step process. In the first step, a chemical treatment agent 102 is infused into the porous ceramic proppant particulates 106. In the second step, the infused porous ceramic proppant particulates 106 are coated with a semi-permeable substantially non-degradable polymer coating 104 to provide a coated proppant particulate. In several exemplary embodiments, the chemical treatment agent 102 is infused into the porous ceramic proppant particulates 106 by vacuum infusion. In other exemplary embodiments, the chemical treatment agent 102 is infused into the porous ceramic proppant particulates 106 using a thermal infusion process whereby the porous ceramic proppant particulates 106 are heated and wetted with a solution containing the chemical treatment agent 102. As the porous ceramic proppant particulates 106 cool, capillary action causes the chemical treatment agent 102 to infuse into the porous ceramic proppant particulates 106. In one or more exemplary embodiments, the chemical treatment agent 102 can be infused into the porous ceramic particulates 106 using a microwave infusion process. In the third step, the degradable shell 302 can be coated onto the proppant particulate 106 containing the chemical treatment agent 102 to provide the encapsulated proppant 300, 400, 500.

According to several exemplary embodiments, the encapsulated proppant 300, 400, 500 is prepared according to a two-step process. In the first step, the porous ceramic proppant particulates 106 are infused with a chemical treatment agent 102 using the thermal infusion process or microwave infusion process described above and coated with a semi-permeable substantially non-degradable polymer coating before the resultant heat from the thermal infusion or microwave infusion process dissipates. In the second step, the degradable shell 302 can be coated onto the proppant particulate 106 containing the chemical treatment agent 102 to provide the encapsulated proppant 300, 400, 500.

According to several exemplary embodiments, the encapsulated proppant particulates 300, 400, 500 can be prepared according to any suitable process. For example, the chemical treatment agent 102 can be coated onto and/or contacted with a proppant particulate 106 to produce a chemical treatment agent containing proppant particulate. In producing the encapsulated proppant 300, 400, 500, the chemical treatment agent containing proppant particulate can be coated with a semi-permeable substantially non-degradable polymer, a degradable polymer, and/or a self-polishing polymer 104. In several exemplary embodiments, additional chemical treatment agent 102 can be mixed with the semi-permeable substantially non-degradable polymer, the degradable polymer, and/or the self-polishing polymer 104 prior to, during, or after coating onto the proppant particulate 106. In other exemplary embodiments, the chemical treatment agent 102 is infused into any porous spaces of the proppant particulate 106 as disclosed herein prior to coating by the chemical treatment agent 102, the semi-permeable substantially non-degradable polymer, the degradable polymer, and/or the self-polishing polymer 104. In one or more exemplary embodiments (not shown), the chemical treatment agent 102 can be mixed with the degradable shell 302 prior to, during, or after coating the degradable shell 302 directly or indirectly onto the proppant particulate 106. The chemical treatment agent 102 can be incorporated into the encapsulated proppant 300, 400, 500, in any manner as disclosed herein without the use of a solvent.

According to several exemplary embodiments, the chemical treatment agent 102 is infused into the porous ceramic proppant particulates 106 without the use of a solvent by melting, thawing, heating, softening, or warming the chemical treatment agent 102 to a sufficiently low viscosity to allow infusion into the porous ceramic proppant particulates 106. In several exemplary embodiments, a sufficiently low viscosity to allow infusion into the porous ceramic proppant particulate 106 is from about 1000-10,000 centipoise (cps), from about 1000-5,000 cps, or from about 1000-2500 cps.

According to several exemplary embodiments, after the chemical treatment agent 102 is melted to a sufficiently low viscosity to allow infusion into the porous ceramic proppant particulates 106, the melted chemical treatment agent 102 is infused into the porous ceramic proppant particulates 106 using the infusion methods described above.

According to several exemplary embodiments, the cartridge 1002 can be placed into any production tubing, such as a subsea riser or surface production tubing in order to deliver the chemical treatment agents 102 to any downstream tubing and/or equipment. According to several exemplary embodiments, the cartridge 1002 can be placed into any pipeline or process apparatus, such as a heat exchanger, in order to deliver chemical treatment agents 102 to a pipeline or any downstream process tubing and/or equipment. The cartridge 1002 can be placed in the production tubing, pipelines and/or process tubing in any suitable manner. In one or more exemplary embodiments, the cartridge 1002 can be placed into the production tubing, pipelines and/or process tubing in an in-line arrangement so that the cartridge 1002 is concentrically arranged inside the production tubing, pipeline or process tubing.

Figure 9:
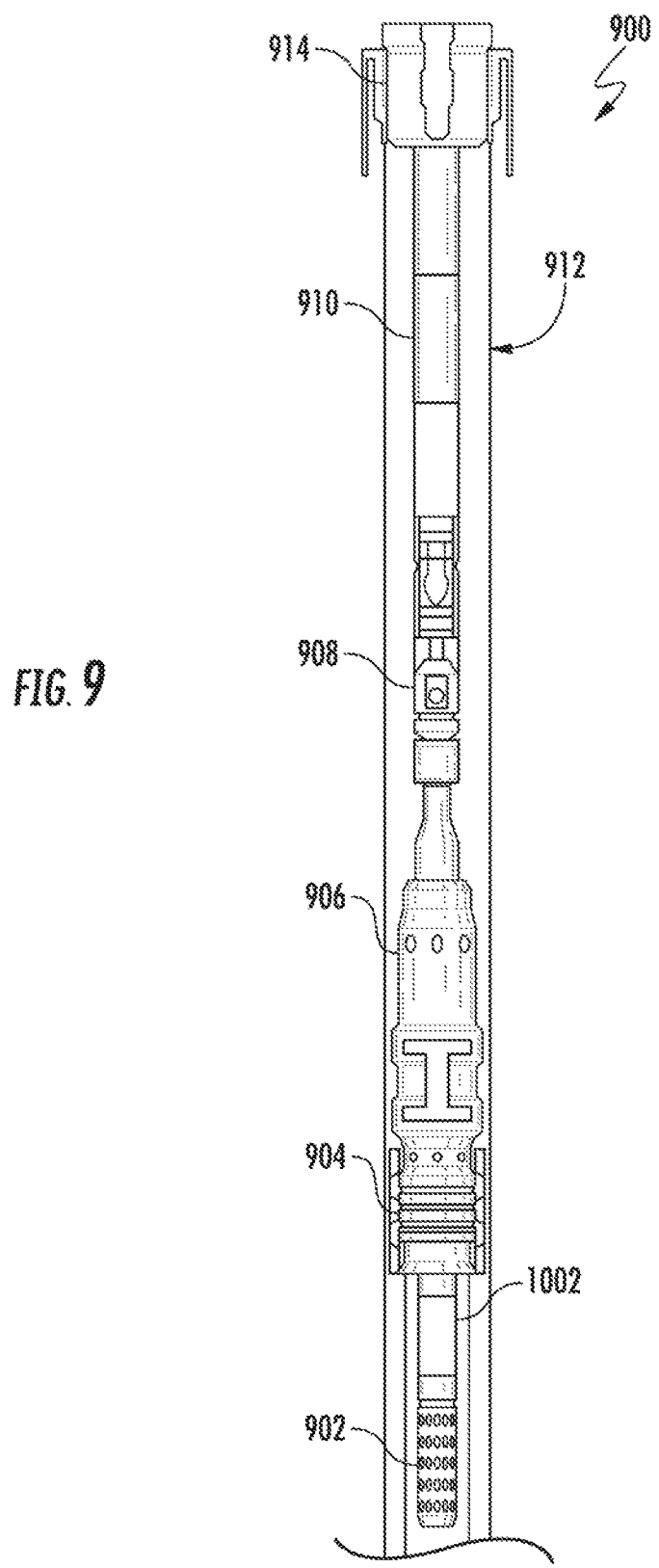
FIG. 9 is a partial-cutaway side view of a submersible pump apparatus containing the cartridge shown in FIG. 1.

FIG. 9 is a partial-cutaway side view of a submersible pump apparatus 900 containing the cartridge 1002 shown in FIG. 1. The submersible pump apparatus 900 can also include a pump inlet 902, a seal assembly 904, a shear coupling assembly 906, a jet pump assembly 908, production tubing 910 and a tubing hanger 914. The tubing hanger 914 can be attached to a wellhead (not shown) and/or a casing 912. The tubing hanger 914 can suspend the rest of the submersible pump apparatus 900 in the casing 912 such that submersible pump apparatus 900 is axially aligned with the casing 912. As shown in FIG. 9, the cartridge 1002 can be disposed between the pump inlet 902 and the seal assembly 904. However, it is contemplated herein that the cartridge 1002 can be disposed at any suitable location along the length of the submersible pump apparatus 900. During placement, the submersible pump apparatus 900 is lowered down the casing 912 until the seal assembly 904 engages the casing 912 or seat (not shown) affixed to the casing 912. In operation of the pump, fluid is drawn into the pump inlet 902 and through the cartridge 1002, thereby contacting the proppant particles disclosed herein to provide treated fluid as disclosed herein. The treated fluid can then flow up the submersible pump apparatus 900, through the seal assembly 904, the shear coupling assembly 906, the jet pump assembly 908, the production tubing 910, the tubing hanger 914 and to the surface, thereby treating any downstream tubing and/or equipment in contact with the treated fluid.

Figure 10:
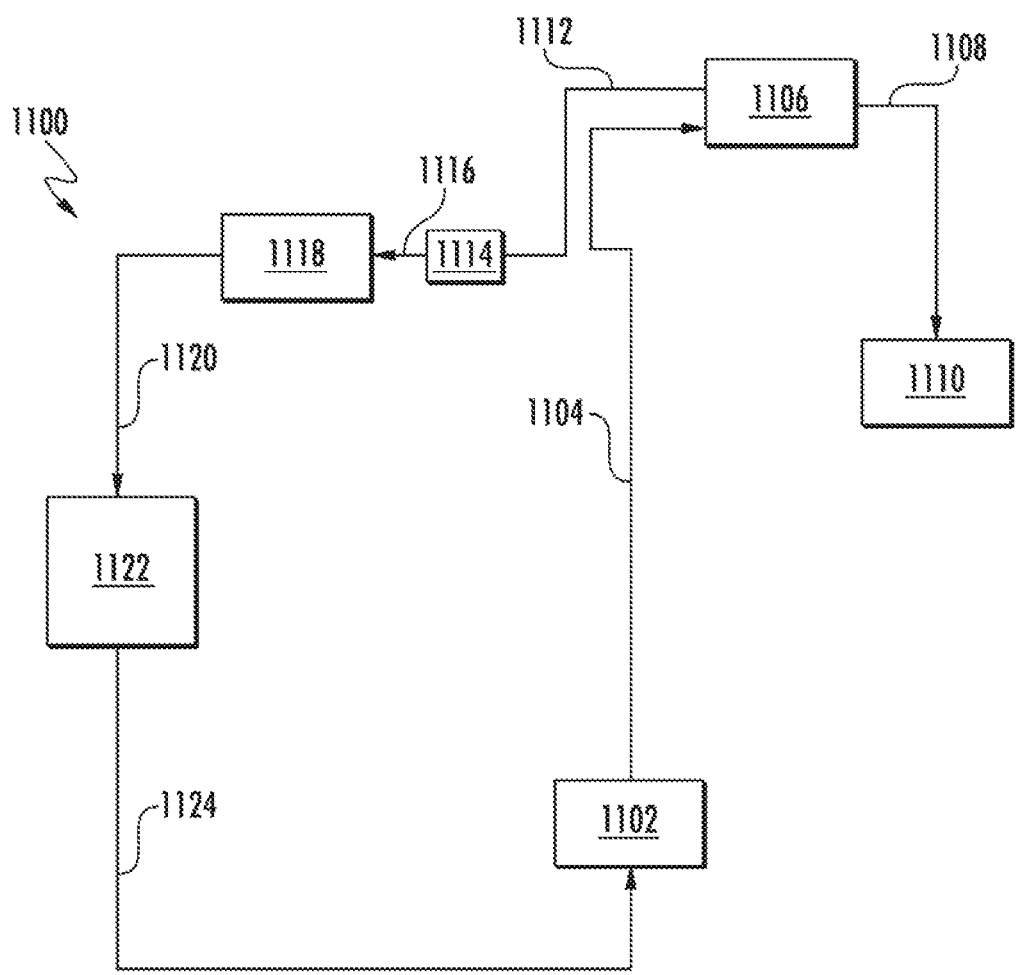
FIG. 10 is a schematic of an illustrative power fluid and production system utilizing the cartridge shown in FIG. 1.

FIG. 10 is a schematic of an illustrative power fluid and production system 1100 utilizing the cartridge 1002 shown in FIG. 1. The power fluid and production system 1100 can include a wellhead 1102, a separator tank 1106, a hydrocarbon storage tank 1110, an in-line cartridge 1114, a power fluid tank 1118, and a pump 1122. The in-line cartridge 1114 can be or include the cartridge 1002 shown in FIG. 1. The separator tank 1106 can be or include any tank or vessel suitable for separating a produced fluid into at least an aqueous phase and a hydrocarbon phase. The hydrocarbon storage tank 1110 and the power fluid tank 1118 can be or include any tank or vessel suitable for holding a fluid and/or a gas. The pump 1122 can be or include any suitable pump for providing power fluid to wellhead 1102 and downhole for any suitable purpose.

In particular, FIG. 10 shows a wellhead 1102 in fluid communication with a separator tank 1106 via line 1104. Production fluid from the wellhead 1102 can enter the separator tank 1106. The separator tank 1106 can separate solids out of the production fluid and the tank 1106 can separate the production fluid into its hydrocarbon, aqueous and/or gaseous phases. An example of a suitable separator tank can be found in U.S. Pat. No. 4,233,154, which is incorporated herein by reference in its entirety. The separator tank 1106 can be in fluid communication with a hydrocarbon storage tank via line 1108 and the in-line cartridge 1114 via line 1112. The separated hydrocarbon phase in the separator tank 1106 can be introduced to the hydrocarbon storage tank via line 1108 and the separated aqueous phase in the separator tank 1106 can be introduced to the in-line cartridge 1114 via line 1112. In another embodiment (not shown), the separated aqueous phase in the separator tank 1106 can be introduced to a water storage tank and the separated hydrocarbon phase in the separator tank 1106 can be introduced to the in-line cartridge 1114. The cartridge 1114 can be used to treat the fluid 1112 in any suitable manner disclosed herein to provide treated fluid via line 1116. The treated fluid via line 1116 can be introduced to the power fluid tank 1116 to provide treated power fluid which can be supplied to pump 112 via line 1120 and subsequently to the wellhead 1102 via line 1124 to operate or power downhole tools or machinery.

The treated fluid via line 1116 can include any amount of chemical treatment agent(s) 102 discussed above that can be released, as disclosed herein, from the chemical treatment agent containing proppant of the proppant pack 1004 shown in FIG. 1 upon contact with the fluid 1112. The treated fluid via line 1116 can be used to treat the power fluid and production system 1100 and/or the wellbore and any downhole tools or equipment disposed in the wellbore.

Figure 11:
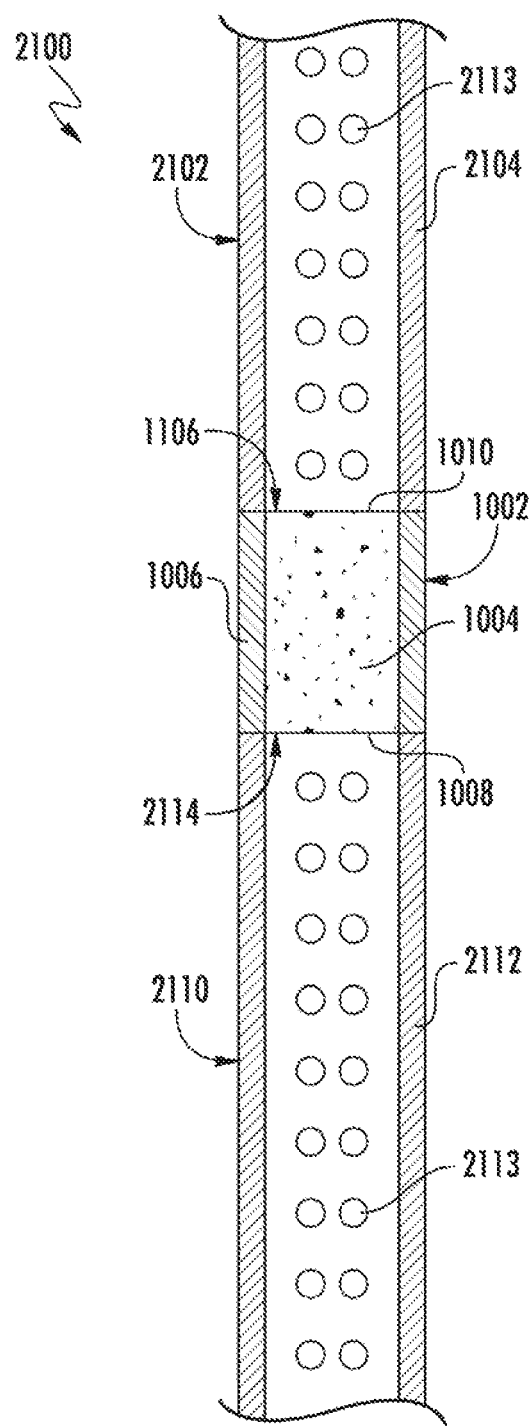
FIG. 11 is a cross sectional side view of two adjoined segments of a liner string containing the cartridge shown in FIG. 1.

FIG. 11 is a cross sectional side view of two adjoined segments 2102, 2110 of a liner string 2100 containing the cartridge 1002 shown in FIG. 1. FIG. 11 shows a first liner segment 2102 having a first cylindrical body 2104 and a first proximal end 2106 and a second liner segment 2110 having a second cylindrical body 2112 and a second proximal end 2114. The first and second cylindrical bodies 2104, 2112 can each have screens, slots, or any other perforations (perforations are shown) 2113 contained in their respective sidewalls to allow fluid flow therethrough. For example, the sidewalls of the first and second cylindrical bodies 2104, 2112 can be formed of screens, slots and/or perforations to allow fluid to flow radially inward from outside the liner string 2110 toward a centerline (not shown) inside the liner segments 2102, 2110.

The cartridge 1002 can be disposed in the liner string 2100 in any suitable manner. In one or more exemplary embodiments, the cartridge 1002 contains helical grooves (not shown) proximateits open first end 1008 that correspond to helical ridges (not shown) proximate the first proximal end 2106 of the first liner segment 2102. The cartridge 1002 can also contain helical ridges (not shown) proximate its open second end 1010 that correspond to helical grooves proximate the second proximal end 2114 of the second liner segment 2110. The helical ridges and grooves of the cartridge 1002 can mate with the corresponding grooves and ridges of the first and second liner segments 2102, 2110 to place the cartridge 1002 between the first and second liner segments 2102, 2110 so that the cartridge 1002 acts as an in-line filter for fluid flowing from the second liner segment 2110 to the first liner segment 2102.

Figure 12:
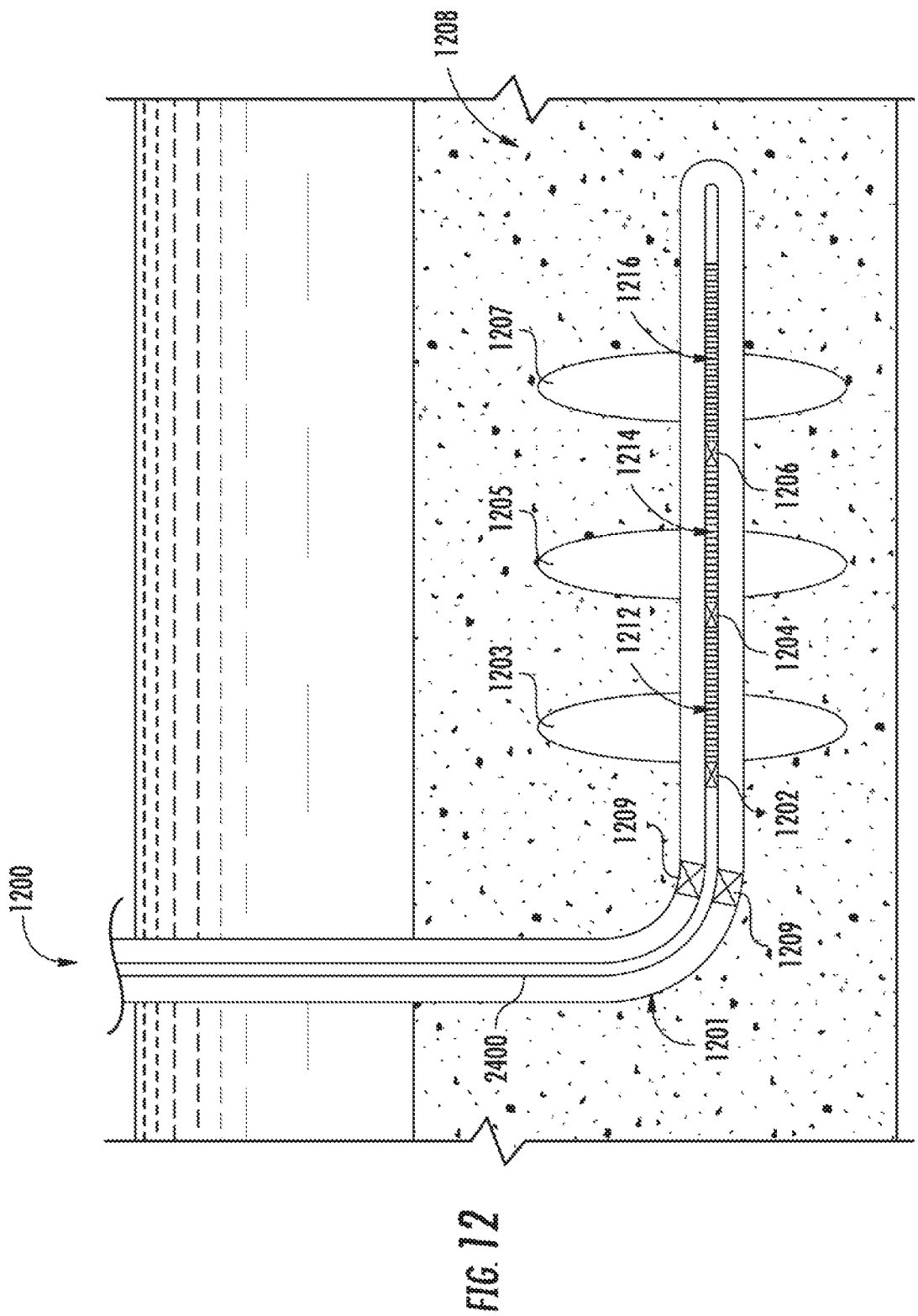
FIG. 12 is a schematic diagram of a well having a liner string with a plurality of cartridges shown in FIG. 1 corresponding to a plurality of hydraulically induced fractures.

FIG. 12 is a schematic diagram of a well 1200 having a liner string 2400 with a plurality of cartridges shown in FIG. 1 (three are shown 1202, 1204, 1206) corresponding to a plurality of hydraulically induced fractures 1203, 1205, 1207. The well 1200 can include a wellbore 1201 that extends through a subterranean formation 1208. The liner string 2400 can be or include the liner string 2100 of FIG. 11. The liner string 2400 can extend from a liner string hanger (not shown) through stages having the induced fractures 1203, 1205, 1207. In one or more exemplary embodiments, the liner string 2400 can include an upper packer 1209 as well as one or more additional packers (not shown) which can be radially expanded for purposes of forming isolated stages for each of the hydraulically induced fractures 1203, 1205, 1207. The packers can form a fluid tight seal between the liner 2400 and a casing 1210 or, in the case of an open hole wellbore, the formation. The packers can be or include a mechanically-set packer, a weight-set packer, a hydraulically-set packer, a swellable material-based packer, a bladder-based packer, or any other suitable packer.

Once the well has been completed and the liner string 2400 has been placed in the wellbore 1201, formation fluid from the fractures can begin to flow from the subterranean formation 1208, through the hydraulically induced fractures 1203, 1205, 1207, through the perforations or openings in the corresponding liner segments 1212, 1214, 1216 and through the cartridges 1202, 1204, 1206 to produce a treated fluid. In one or more exemplary embodiments, the hydraulically induced fractures 1203, 1205, 1207 can produce formation fluid in stages. For example, the fluid pressure in fracture 1207 can be higher than the fluid pressure in fractures 1203, 1205 resulting in induced fracture 1207 producing before fractures 1203, 1205 begin to produce. After a period of time, production from each stage initiates sequentially, from the fracture proximate the toe of the wellbore to the fracture proximate the heel of the wellbore. For example, when fluid pressures in fractures 1207 and 1205 equalize, fracture 1205 will produce along with fracture 1207. Likewise, fracture 1203 can begin to produce once the fluid pressure in fracture 1205 equalizes with the fluid pressure in fracture 1203.

In one or more exemplary embodiments, the chemical treatment agent 102 can be or include any suitable tracer, such as one or more metallic or non-metallic elements, one or more RFID tags, one or more nanoparticles, and/or one or more biological markers. The tracer material can indicate whether a zone or fracture is producing. For example, the relative concentrations of the tracer material(s) contained in production fluid arriving at the surface can indicate which fracture(s) or zone(s) are producing.

According to several exemplary embodiments, the biological marker is DNA. DNA, or deoxyribose nucleic acid, is sometimes a double-stranded helical molecule that encodes the genetic information of almost all living systems. Each DNA molecule can be unique as a result of a particular sequence of nitrogenous bases—adenine ("A"), thymine ("T"), cytosine ("C") and guanine ("G")—contained with the molecule. The double helix structure is formed and maintained by the pairing of a nitrogenous base on one phosphate/sugar backbone carrier chain with a nitrogenous base on the other phosphate/sugar backbone carrier chain through hydrogen bonding. Specifically, an adenine base will pair with a thymine base (an "AT" base pair), and a cytosine base will pair with a guanine base (a "GC" base pair). Probability terms can be calculated for the frequency of a given sequence of bases, and as long as a large enough DNA molecule is used, the "uniqueness" of a particular molecule of DNA can be known with sufficient certainty. The DNA molecule may be naturally occurring or a manufactured (synthetic) DNA and can be double stranded or single stranded. Synthetic DNA is commercially available and may be manufactured to order by several specialized DNA manufacturers, such as GenScript, Synthetic Genomics, DNA 2.0, Genewiz, Inc., Life Technologies, and Cambrian Genomics. Further, the DNA can be "encapsulated" to enhance its survivability at downhole reservoir conditions and to otherwise alter its interaction with formation fluids. Additionally, specific DNA sequences may be selected for use based on compatibility with the thermal environment of a specific well.

DNA alone can be used as the biological marker. DNA is typically water-soluble and can be infused into, coated onto, and/or mixed with the coating 104, 204 on the proppant particulate 106 without any modification in order to function as a water-soluble biological marker. According to several exemplary embodiments, the DNA can be formulated in such a way that it is hydrocarbon-soluble and will separate into hydrocarbon fluids as well. For example, the water-solubility of DNA is due to the negative charges associated with the phosphodiester groups of the DNA. The negative charges of the phosphodiester structures can be removed by methylation. Methylation of this region of the DNA molecule will ensure that this part of the molecule becomes hydrophobic, i.e., hydrocarbon-soluble, thereby ensuring that the DNA molecule is soluble in the hydrocarbon phase. Other procedures for formulating hydrocarbon-soluble DNA can be found in U.S. Pat. No. 5,665,538, the entire disclosure of which is herein incorporated by reference.

While DNA itself can be used as a biological marker, the reservoir conditions in which the DNA is placed may not be optimal for the long term survivability of the DNA. These conditions include reservoir temperatures exceeding 200° F. and sometimes up to 400° F., as well as highly saline formation waters. However, numerous DNA encapsulation techniques are well known to those of ordinary skill in the art and by encapsulating the DNA, its survivability in harsh conditions is greatly enhanced. The partitioning of the DNA, whether into the hydrocarbon or water phase, can be tailored by tailoring the encapsulation material. In particular, the wettability or fluid affinity of the encapsulation material can be tailored to favor water or hydrocarbons.

Additionally, molecules containing specific nucleotide sequences can be selectively used to enhance compatibility with the harsh wellbore and formation temperatures and pressures based on the improved thermal stability displayed by DNA molecules having higher concentrations of certain base pairs. Specifically, the DNA molecules having the greatest thermal resistance are those which include higher levels of GC base pairs and lower levels of AT base pairs. For example, the sequence GCAT (with corresponding base pair sequence CGTA) shows thermal stability at temperatures of from about 186 to 221° F. The sequence GCGC (with corresponding base pair sequence CGCG) is thermally resistant at temperatures of up to about 269 to 292° F. Conversely, the inclusion of higher levels of AT base pairs reduces thermal stability. For example, some thymine in the combination reduces the stability such that the sequence ATCG (with corresponding base pair sequence TAGC) only survives at temperatures of up to about 222 to 250° F., while the sequence TATA (with corresponding base pair sequence ATAT) is thermally stable at temperatures of up to only about 129 to 175° F. In addition, if the DNA molecules that include the sequence ATCG (with corresponding base pair sequence TAGC) are manipulated to include a modification known as G-clamp, the thermal stability increases by an additional 32° F. or from temperatures of up to about 254 to 282° F. As shown below, the G-clamp modification involves adding a tricyclic analogue of cytosine giving the duplex base pair (G-C) an additional hydrogen bond.

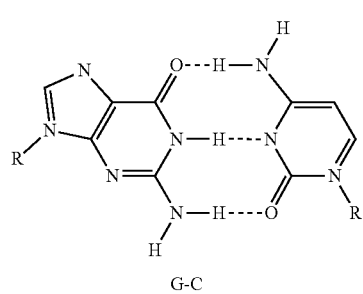

G-C

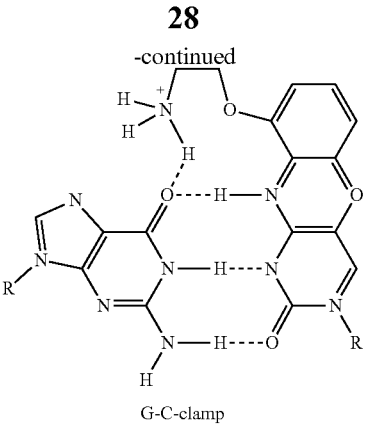

G-C-clamp

By increasing the hydrogen bonding of the duplex base pair from 3 to 4, the thermal stability increases by an additional 32° F.

The DNA can be either single stranded or double stranded. The natural orientation of DNA in the double stranded version is the Watson-Crick pairing. Synthetic DNA, however, is not constrained in the same way as natural DNA. Still, the indicator of thermal stability is a thermodynamic reorientation of the strands and consists primarily of the strands separating into two single strands. This is known as melting and happens over a narrow temperature range. What has been observed is that the DNA of some organisms resists this thermal collapse, examples being certain thermophilic organisms. Analysis of their genomes gives a direct correlation between the levels of G-C DNA in the sequences. Thermal stability is directly or indirectly related to the number of hydrogen bonds between the bases in the duplex pairs. However, the stacking (pairing in the double strands) is also a factor. It has been determined that an important feature of thermal stability in natural DNA relies heavily upon the molar ratio of G-C pairing since this gives the highest density of hydrogen bonds. Thermal stability ultimately depends upon the so-called melting point where the strands of a double stranded DNA separate. This has no significance to single stranded synthetic DNA, however, which is already separated. The separation of the strands of double stranded DNA which occurs at the melting point is to some extent reversible. The strands can re-join once the temperature drops sufficiently. The thermal stability depends upon the thermal resistance of the base pairs or duplex units as well as the stacking forces which join the strands of double stranded DNA. As noted above, thermal stability can also be improved by modifying the molecular arrangement within a particular base pair. For instance, in addition to the G-G-Clamp modification noted above, the thermal stability of an A-T base pair can be improved, as shown below, by modifying the adenine-thymine base pair to include a 2-aminoadenine-T complex which increases the hydrogen bonding in the complex from 2 to 3 and increases its thermal stability by about 5° F.

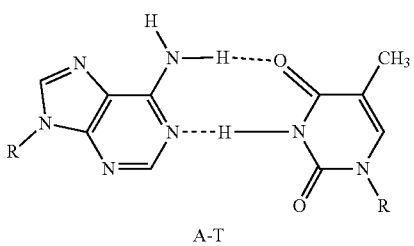

A-T

-continued

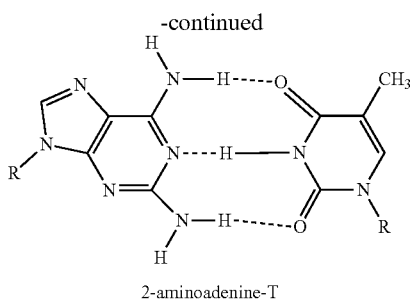

2-aminoadenine-T

The thermal stability of specific base pairs can be used to generate a thermodynamic assessment of potential. As noted above, reasonable chemical modifications can extend this thermal range and retain the essential features of DNA for the purposes of measurement. The chemical nature of DNA means that it is susceptible to hydrolysis and the rate of hydrolysis increases with increasing temperature. Hydrolysis is another route for the decomposition of DNA in addition to decomposition due to its melting behavior as discussed above. That said, it is known that a number of organisms survive extremes of temperature which means that their genetic material must have some inherent thermal stability. This response has been directly correlated to the molar fraction of G-C base pairs irrespective of whether such base pairs are present as single or double strands. Natural DNA, however, is chromosomal and so must be double stranded.

Also it has been shown that the repetition of the G-C duplex appears to impart more stability since it has a direct effect upon the thermal resistance of the DNA. This shows how various organisms cope with high temperature by incorporating a larger G-C molar fraction into their genome. It appears that the molar fraction of G-C is the key rather than any weak link, which might be incorporated into the sequence. Chain terminators appear to have little overall effect on the thermal stability of the DNA. Essentially, what this means is that the molar fraction of certain base pairs in the DNA sequence can be varied according to the temperature range required. Getting down to the detail of destruction reactions for the DNA sequence will depend upon the environment to which a particular DNA sequence will be subjected and the exposure to hydrolysis reactions are an area of concern. However the modifications of the base pairs discussed above which can be introduced while still retaining the inherent features which make DNA an ideal tracer offer clear routes for tailor-made tracers for oilfield use.

Selectively using a specific DNA molecule as a biological marker based on its thermal stability properties allows for the use of DNA as a biological marker over a far wider range of conditions than is currently possible. Further, the survival of the DNA molecules at higher temperatures allows for accurate detection even with very low levels of DNA present in the formation by avoiding degradation of the DNA. Additionally, the diverse number of unique DNA molecules vastly adds to the number of unique tracers which can be applied in the oilfield, thereby greatly increasing both the range and diversity of oilfield operations to which biological markers can be applied and greatly improving the knowledge and understanding of increasingly complex wells and their behavior. This knowledge will lead to better completion and stimulation practices resulting in cost savings and improved well performance.

In several exemplary embodiments, a DNA molecule exhibiting specific thermostability properties, based on its specific nitrogenous base composition that are compatible with the thermal environment of a specific well, can be selectively infused into and/or coated onto the proppant particulate 106 to be used in the well operations according to the methods and embodiments described herein. For example, for wells exhibiting temperatures of up to about 269 to 292° F., a DNA molecule containing the GCGC sequence could be synthesized and infused into and/or coated onto the proppant particulates 106 to be injected into the well formation. This DNA molecule would better withstand the thermal conditions of the well, thereby allowing it to be more effectively used as a biological marker that conveys information regarding well formation and production.

According to several exemplary embodiments, the chemical treatment agent 102, such as a biological marker separates from the proppant particulates 106 continuously over a period of up to about one year, up to about five years, or up to about ten years after placement of the cartridge 1002 proximate to the hydraulically created fracture. Systems, techniques and compositions for providing for the sustained release of DNA are well known to those of ordinary skill in the art. For example, European Patent No. 1,510,224, the entire disclosure of which is incorporated herein by reference, discloses several methods for enabling the sustained release of DNA over a period of time. According to several exemplary embodiments, DNA is encapsulated with a polymer or a material infused with DNA is coated with a permeable nondegradeable coating. In several exemplary embodiments, the encapsulating polymer includes one or more of high melting acrylate-, methacrylate- or styrene-based polymers, block copolymers of polylactic-polyglycolic acid, polyglycolics, polylactides, polylactic acid, gelatin, water-soluble polymers, cross-linkable water-soluble polymers, lipids, gels, silicas, or other suitable encapsulating materials. Additionally, the encapsulating polymer may include an encapsulating material that includes a linear polymer containing degradable co-monomers or a cross-linked polymer containing degradable cross-linkers.

According to several exemplary embodiments, the biological marker is DNA. DNA, or deoxyribose nucleic acid, is sometimes a double-stranded helical molecule that encodes the genetic information of almost all living systems. Each DNA molecule can be unique as a result of a particular sequence of nitrogenous bases—adenine ("A"), thymine ("T"), cytosine ("C") and guanine ("G")—contained with the molecule. The double helix structure is formed and maintained by the pairing of a nitrogenous base on one phosphate/sugar backbone carrier chain with a nitrogenous base on the other phosphate/sugar backbone carrier chain through hydrogen bonding. Specifically, an adenine base will pair with a thymine base (an "AT" base pair), and a cytosine base will pair with a guanine base (a "GC" base pair). Probability terms can be calculated for the frequency of a given sequence of bases, and as long as a large enough DNA molecule is used, the "uniqueness" of a particular molecule of DNA can be known with sufficient certainty. The DNA molecule may be naturally occurring or a manufactured (synthetic) DNA and can be double stranded or single stranded. Synthetic DNA is commercially available and may be manufactured to order by several specialized DNA manufacturers, such as GenScript, Synthetic Genomics, DNA 2.0, Genewiz, Inc., Life Technologies, and Cambrian Genomics. Further, the DNA can be "encapsulated" to enhance its survivability at downhole reservoir conditions and to otherwise alter its interaction with formation fluids.

Additionally, specific DNA sequences may be selected for use based on compatibility with the fluids from a particular fracture or producing zone.

According to certain embodiments of the present disclosure, the tracer material includes metallic or non-metallic nano-particles while in other embodiments, the tracer material includes a chemical tracer. In one or more exemplary embodiments, the chemical treatment agents 102 include one or more radio-frequency identification (RFID) tags. The RFID tag can be included on and/or in any of the proppant particulates 106 disclosed herein in any manner disclosed herein. The RFID tag can be coated on and/or infused into the porosity of the proppant, for example the porous ceramic proppant particulates 106. The RFID tags can have any suitable size. For example, the RFID tag can have a size suitable for infusing the RFID tag into one or more pores of the porous ceramic proppant particulates 106. In one or more exemplary embodiments, the RFID tag can have a size range from about 10 nm to about 2 mm, measured in its largest dimension. In one or more exemplary embodiments, the infused RFID tags can elute from the porous ceramic proppant particulates 106 located in a subterranean environment and reliably carried to the surface in produced fluid. The produced fluid can be water or a hydrocarbon and RFID tracer can be infused with the water-soluble or hydrocarbon-soluble resin materials disclosed herein so that the RFID tags elute in the presence of produced water or produced hydrocarbons. The RFID tags can be passive RFID tags or active RFID tags. For example, a passive RFID tag can elute from the proppant particulate as disclosed above and activated at or near the surface by a power source located at or near the surface to cause a signal to emit from the RFID tag. After activation, the RFID tag can emit a signal that can be recorded, decoded, and/or analyzed at or near the surface to determine which zone(s) are producing and whether water or hydrocarbons are being produced from the respective zone(s).

According to several exemplary embodiments, the chemical treatment agents 102 can be or include chemical tracer materials, such as the biological tags described in International Patent Publication No. WO2007/132137, various dyes, fluorescent materials, as well as biological markers, such as DNA. Other chemical tracers can include fluorine substituted compounds. According to several exemplary embodiments, in order to ensure the tracer is reliably carried to the surface in produced fluid, the tracer is soluble in the produced fluid. The produced fluid can be water or a hydrocarbon and there are available tracers that are only soluble in water or only soluble in liquid hydrocarbon or only soluble in hydrocarbon gases. This variable solubility allows for more definitive diagnostic capabilities.

In order for the biological marker to be reliably carried to the surface in produced fluid, the biological marker must be capable of eluting from the proppant particulate 106 and partitioning into the produced fluid which may be a water-based or hydrocarbon-based fluid. According to several exemplary embodiments, the biological marker can be encapsulated to preferentially partition into either or both water and hydrocarbon phases, depending on the diagnostic goals. This variable partitioning allows for more definitive diagnostic capabilities.

According to several exemplary embodiments, when the well is placed on production following the installation of the cartridges 1002, the biological marker will elute from the proppant particulates 106 and will partition into one or both of the produced hydrocarbons and water. Samples of the produced water and hydrocarbons are then captured at different points in time and analyzed for the presence of the unique biological markers. By identifying the presence and relative concentration of each of the biological markers, diagnostic determinations can be made of the effectiveness of the stimulation and the hydrocarbon or water productivity of the stimulated formation. This diagnostic information can then be utilized to optimize subsequent hydraulic fracturing operations in nearby wells. In several exemplary embodiments, separation of the biological marker from the proppant particulates 106 can be accomplished by the biological marker leaching, eluting, diffusing, bleeding, discharging, draining, seeping, or leaking out of the proppant, or any combination thereof. Further, this leaching, eluting, diffusing, bleeding, discharging, draining, seeping, or leaking out of the proppant, or any combination thereof can be further controlled by a permeable coating 104.

As mentioned above, the partitioning of the biological marker, i.e., whether into the hydrocarbon or water phase, can be tailored based on the needs of the fracturing operation by tailoring the encapsulation material. If, for example, diagnostic information is needed about a hydrocarbon-producing section of the well, a proppant particulate 106 can be infused and/or coated with an encapsulated hydrocarbon-partitioning biological marker, which will then separate from the proppant into the surrounding hydrocarbon fluids. Conversely, if diagnostic information is needed about a water-producing section of the well, a proppant particulate can be infused and/or coated with an encapsulated water-partitioning biological marker, which will then separate from the proppant into the water.

The biological marker 102 can leach, elute, diffuse, bleed, discharge, desorb, dissolve, drain, seep, or leak from the coated proppant particulates 100, 200 and/or the encapsulated proppant particulates 300, 400, 500 at any suitable rate. According to one or more exemplary embodiments, the biological marker can leach, elute, diffuse, bleed, discharge, desorb, dissolve, drain, seep, or leak from the coated proppant particulates 100, 200 and/or the encapsulated proppant particulates 300, 400, 500 at a rate of at least about 0.1 ppm/(gram*day), at least about 0.3 ppm/(gram*day), at least about 0.7 ppm/(gram*day), at least about 1.25 ppm/(gram*day), at least about 2 ppm/(gram*day), at least about 3 ppm/(gram*day), at least about 4 ppm/(gram*day), at least about 6 ppm/(gram*day), or at least about 8 ppm/(gram*day) for at least about 2 weeks, at least about 1 month, at least about 2 months, at least about 6 months, at least about 9 months, at least about 1 year, or at least about 2 years. For example, the biological marker 102 can elute from the coated proppant particulates 100, 200 and/or the encapsulated proppant particulates 300, 400, 500 at a rate from about 0.01 ppm/(gram*day), about 0.05 ppm/(gram*day), about 0.1 ppm/(gram*day), about 0.5 ppm/(gram*day), about 1 ppm/(gram*day), about 1.5 ppm/(gram*day), about 2 ppm/(gram*day), or about 3 ppm/(gram*day) to about 4 ppm/(gram*day), about 4.5 ppm/(gram*day), about 5 ppm/(gram*day), about 6 ppm/(gram*day), about 7 ppm/(gram*day), about 8 ppm/(gram*day), about 10 ppm/(gram*day), about 15 ppm/(gram*day), about 30 ppm/(gram*day), or about 75 ppm/(gram*day) for at least about 2 weeks, at least about 1 month, at least about 2 months, at least about 6 months, at least about 9 months, at least about 1 year, or at least about 2 years.

According to several exemplary embodiments, after the chemical treatment agent 102, such as a biological marker separates from the proppant and partitions into a production fluid, the production fluid will then transport the biological marker to the surface. Once the production fluids reach the surface, the fluids can be analyzed for the presence of the biological marker.

According to several exemplary embodiments, the chemical treatment agent 102 includes one or more biological markers having unique identifiers and the unique identifier of the one or more biological markers is logged before the cartridge 1002 containing the one or more markers is placed in the wellbore. In several exemplary embodiments when multiple biological markers are used across one or all of the stages of a fracture, this log will enable the well operator to match the biological marker in the production fluid to the section of the fracture where it was produced. For example, if three unique DNA markers are placed in cartridges proximate to stages 1, 2, and 3, respectively, the unique identifying base sequence of each DNA marker for stages 1, 2, and 3 will be recorded. If DNA is detected in the production fluids at the surface, the sequence of the returned DNA can be compared to the log to determine which stages produced the DNA. Relative amounts of each marker can be used to quantitatively estimate the relative volumes of the produced fluids from each of the stages. Identification and detection of DNA sequences is well known in the art and many companies manufacture "off-the-shelf" identification and detection assays. For example, DNA detection and identification assays and kits are available commercially from Molecular Devices, LLC and Illumina, Inc. Further, DNA replication methodologies are well known to those of ordinary skill in the art. This permits extremely low levels of DNA present in the produced fluids, which may be below detection limits, to be identified by first employing a replication procedure to increase the concentration of the DNA beyond detection limits. Because the replication methods proportionally increase all DNA present, the relative amount of the individual DNA markers present is not altered.

According to several exemplary embodiments, once the biological markers are recovered from the production fluids and identified, a comparative analysis of the amount of biological marker from each stage or stage segment in the sample can then be related to the amount of hydrocarbon or water produced from that section. For example, the relative hydrocarbon or water volume contribution of a stage or stages of the formation can be estimated based on the amount of biological markers recovered, i.e. with more hydrocarbon or water produced from that stage resulting in more biological detection from that stage. Additionally, the relative hydrocarbon or water volume contribution of a segment of a stage can be estimated based on the amount of biological markers recovered from the segment of the stage. Based on this analysis, a diagnostic log across multiple stages of a fractured formation can be developed, giving a well operator detailed knowledge about the production volume (or lack thereof) of the entire fractured formation. This analysis can likewise be repeated periodically over an extended timeframe to establish trends in the production performance of the well providing diagnostic information that is not now available with existing technologies.

The following examples are illustrative of the compositions and methods discussed above.

EXAMPLES

The examples following below were carried out using exemplary materials in order to determine the elution rate of DTPMP (diethylenetriamine penta(methylene phosphonic acid)), a corrosion and scale inhibitor, from porous proppant infused with DTPMP and coated with various polymers and compared to uncoated porous proppant infused with DTPMP. These examples are meant to be illustrative of exemplary embodiments of the present disclosure and are not intended to be exhaustive.

Example 1

Four 500 gram batches of 20/40 CARBO UltraLite, an ultra-lightweight ceramic proppant having an ASG of 2.71 and having a porosity of 20-25% that is commercially available from CARBO Ceramics, Inc., were each infused with a diethylenetriamine penta(methylene phosphonic acid) ("DTPMP") solution having a solids content of 41%, which is commercially available from Riteks, Inc., and were then coated with a semi-permeable substantially non-degradable polymer in a two-step process as described below.

Each batch of proppant was heated in an oven set to 482° F. (250° C.) for approximately one hour. The heated batches of proppant were then removed from the oven and allowed to cool until they reached a temperature of between 430-440° F. as monitored by a thermocouple. Once the proppant batches reached the desired temperature, 64.2 grams of the DTPMP solution was added to each batch and allowed to infuse into the proppant particulates for approximately three minutes, such that the DTPMP constituted 5% by weight of the infused proppant. After the proppant particulates were infused with DTPMP, each batch was coated with a semi-permeable substantially non-degradable polymer.

The Batch 1 proppant was coated according to the following procedure with a phenol formaldehyde standard reactivity resin that is commercially available from Plastics Engineering Company under the trade name Plenco 14870. Compared to the other phenol formaldehyde resins discussed below, the Plenco 14870 resin had a relatively low viscosity of about 1100 cps at 150° C. After the coating procedure, the Batch 1 proppant included 2% by weight of the polymeric coating.

The Batch 1 proppant was placed in a heated mixing bowl and was monitored with a thermocouple until the proppant reached a temperature of between 410-420° F. When the proppant reached the desired temperature, 8.08 grams of the phenol formaldehyde resin was added to the proppant and allowed to melt and spread over the proppant for approximately 45 seconds. Next, 2.63 grams of a 40% hexamethylenetetramine (which is also known as and will be referred to herein as "hexamine"), solution, and which is commercially available from The Chemical Company, was added to crosslink and cure the phenol formaldehyde resin and was allowed to mix for 1 minute and 25 seconds. Finally, 1.2 grams of a 50-60% cocoamidopropyl hydroxysultaine surfactant, which is commercially available from The Lubrizol Corporation under the trade name "Chembetaine™ CAS", was added and allowed to mix for 1 minute.

The Batch 2 proppant was coated according to the following procedure with a phenol formaldehyde highly reactive, high viscosity polymer resin that is commercially available from Plastics Engineering Company under the trade name Plenco 14750. Compared to the other phenol formaldehyde resins discussed above and below, the Plenco 14750 resin had a relatively high viscosity of about 34,900 cps at 150° C. After the coating procedure, the Batch 2 proppant included 2% by weight of the polymeric coating.

The Batch 2 proppant was placed in a heated mixing bowl and was monitored with a thermocouple until the proppant reached a temperature of between 410-420° F. When the proppant reached the desired temperature, 8.08 grams of the phenol formaldehyde resin was added to the proppant and allowed to melt and spread over the proppant for approximately 45 seconds. Next, 2.63 grams of a 40% hexamine solution, which is commercially available from The Chemical Company, was added to crosslink and cure the phenol formaldehyde resin and was allowed to mix for 1 minute and 25 seconds. Finally, 1.2 grams of a 50-60% cocoamidopropyl hydroxysultaine surfactant, which is commercially available from The Lubrizol Corporation under the trade name "Chembetaine™ CAS", was added and allowed to mix for 1 minute.

The Batch 3 proppant was coated according to the following procedure with the phenol formaldehyde highly reactive, high viscosity polymer resin mentioned above that is commercially available from Plastics Engineering Company under the trade name Plenco 14750. As discussed above, the Plenco 14750 resin had a relatively high viscosity of about 34,900 cps at 150° C. After the coating procedure, the Batch 3 proppant included 4% by weight of the polymeric coating.

The Batch 3 proppant was placed in a heated mixing bowl and was monitored with a thermocouple until the proppant reached a temperature of between 410-420° F. When the proppant reached the desired temperature, 17.61 grams of the phenol formaldehyde resin was added to the proppant and allowed to melt and spread over the proppant for approximately 45 seconds. Next, 5.72 grams of a 40% hexamine solution, which is commercially available from The Chemical Company, was added to crosslink and cure the phenol formaldehyde resin and was allowed to mix for 1 minute and 25 seconds. Finally, 1.2 grams of a 50-60% cocoamidopropyl hydroxysultaine surfactant, which is commercially available from The Lubrizol Corporation under the trade name "Chembetaine™ CAS", was added and allowed to mix for 1 minute.

The Batch 4 proppant was coated according to the following procedure with a polyurethane polymer that is made by reacting a polyisocyanate resin with a curing agent both of which are commercially available from Air Products, Inc. under the trade names ANCAREZ® ISO HDiT and AMICURE® IC221, respectively. After the coating procedure, the Batch 4 proppant included 4% by weight of the polyurethane polymeric coating.

The Batch 4 proppant was placed in a mixing bowl that was maintained at room temperature. At room temperature, 13.5 grams of the curing agent AMICURE® IC221was added to the proppant batch and mixed for one minute. After one minute, 7.2 grams of the ANCAREZ® ISO HDiT polyisocyanate resin was added to the proppant batch and mixed with the proppant for approximately 5 minutes.

A fifth proppant batch was then prepared that included 1000 grams of 20/40 CARBO UltraLite ceramic proppant. The Batch 5 proppant was infused with DTPMP and coated in a one-step thermal infusion process with a phenol formaldehyde highly reactive, low viscosity polymer resin that is commercially available from Plastics Engineering Company under the trade name Plenco 14862. Compared to the other phenol formaldehyde resins discussed above and below, the Plenco 14862 resin had a relatively low viscosity of about 1080 cps at 150° C. After the one-step thermal infusion process, the Batch 5 proppant included 2% by weight of the polymeric coating.

The Batch 5 ceramic proppant was heated in an oven set to 482° F. (250° C.) for approximately one hour. The heated batch of proppant was then removed from the oven and allowed to cool until it reached a temperature of between 430-440° F. as monitored by a thermocouple. Once the proppant batch reached the desired temperature, 128.4 grams of the DTPMP solution was added to the batch and allowed to infuse into the proppant particulates for approximately 5 seconds, such that the DTPMP constituted 5% by weight of the infused proppant. After 5 seconds had elapsed, 17.35 grams of the phenol formaldehyde, high reactivity, low viscosity polymer resin (Plenco 14862) was added to the proppant batch. After another 5 seconds had elapsed, 5.64 grams of a 40% hexamine solution, which is commercially available from The Chemical Company, was added to crosslink and cure the phenol formaldehyde resin and was allowed to mix for 10 minutes and 15 seconds. Finally, 1.2 grams of a 50-60% cocoamidopropyl hydroxysultaine surfactant, which is commercially available from The Lubrizol Corporation under the trade name "Chembetaine™ CAS", was added and allowed to mix for another 30 seconds.

Finally, a sixth proppant batch was prepared as a control. The Batch 6 control proppant batch, included 1000 grams of 20/40 CARBO UltraLite ceramic proppant and was infused with DTPMP but did not include a polymeric coating.

The Batch 6 ceramic proppant was heated in an oven set to 482° F. (250° C.) for approximately one hour. The heated batch of proppant was then removed from the oven and allowed to cool until it reached a temperature of between 430-440° F. as monitored by a thermocouple. Once the proppant batch reached the desired temperature, 241.8 grams of the DTPMP solution was added to the batch and allowed to infuse into the proppant particulates for approximately 3 minutes, such that the DTPMP constituted 9% by weight of the infused proppant.

Table 1 below represents the 6 batches prepared for Example 1.

TABLE 1

Example 1 Batches

| Batch Number | Infusant/Polymer Coating |
|---|---|
| Batch 1 | 5% by weight DTPMP, 2% by weight phenol formaldehyde, standard reactivity, low viscosity (Plenco 14870) |
| Batch 2 | 5% by weight DTPMP, 2% by weight phenol formaldehyde, high reactivity, high viscosity (Plenco 14750) |
| Batch 3 | 5% by weight DTPMP, 4% by weight phenol formaldehyde, high reactivity, high viscosity (Plenco 14750) |
| Batch 4 | 5% by weight DTPMP, 4% by weight polyurethane |
| Batch 5 | 5% by weight DTPMP, 2% by weight phenol formaldehyde, high reactivity, low viscosity (Plenco 14862) |
| Batch 6 | 9% by weight DTPMP, no coating |

Proppant Batches 1-6 were then placed in a seawater eluent for one hour. The seawater eluent was prepared according to the ASTM D1141-98(2013) procedure and had the composition shown below in Table 2.

TABLE 2

| ION & SALT | ION CONC. (mg/L) |
|---|---|
| $K^+$ as KCl | 403.0 |
| $Mg^{2+}$ as $MgCl_2 \cdot 6H_2O$ | 657.0 |
| $Na^+$ as NaCl | 10025.6 |
| $HCO_3^-$ as $NaHCO_3$ | 159.0 |
| $Na^+$ as $NaHCO_3$ | 59.9 |
| $SO_4^{2-}$ as $Fe_2SO_4 \cdot 7H_2O$ | 0.0 |
| $SO_4^{2-}$ as $Na_2SO_4 \cdot 10H_2O$ | 1308.0 |
| $Na^+$ as $Na_2SO_4 \cdot 10H_2O$ | 626.1 |
| $Ca^{2+}$ as $CaCl_2 \cdot 2H_2O$ | 329.0 |

TABLE 2-continued

| ION & SALT | ION CONC. (mg/L) |
|---|---|
| $Sr^{2+}$ as $SrCl_2 \cdot 6H_2O$ | 7.0 |
| $Ba^{2+}$ as $BaCl_2 \cdot 2H_2O$ | 0.0 |
| Fe(II) as $FeCl_2 \cdot 4H_2O$ | 0.0 |
| Fe(II) as $FeSO_4 \cdot 7H_2O$ | 0.0 |
| $CH_3COO^-$ as $CH_3COONa \cdot 3H_2O$ | 1.0 |
| $Na^+$ as CH3COONa | 0.4 |
| Total $SO_4^{2-}$ | 1308.0 |
| Total $Na^+$ | 10712.0 |
| $Cl^-$ from analysis (mg/L) = | 18330.0 |
| $Cl^-$ from calculation (mg/L) = | 18330.0 |
| Error (%) = | 0.00% |
| Total Salt Weight (mg/L) = | 37591 |
| Salt Concentration (%) = | 3.76% |

Figure 13:
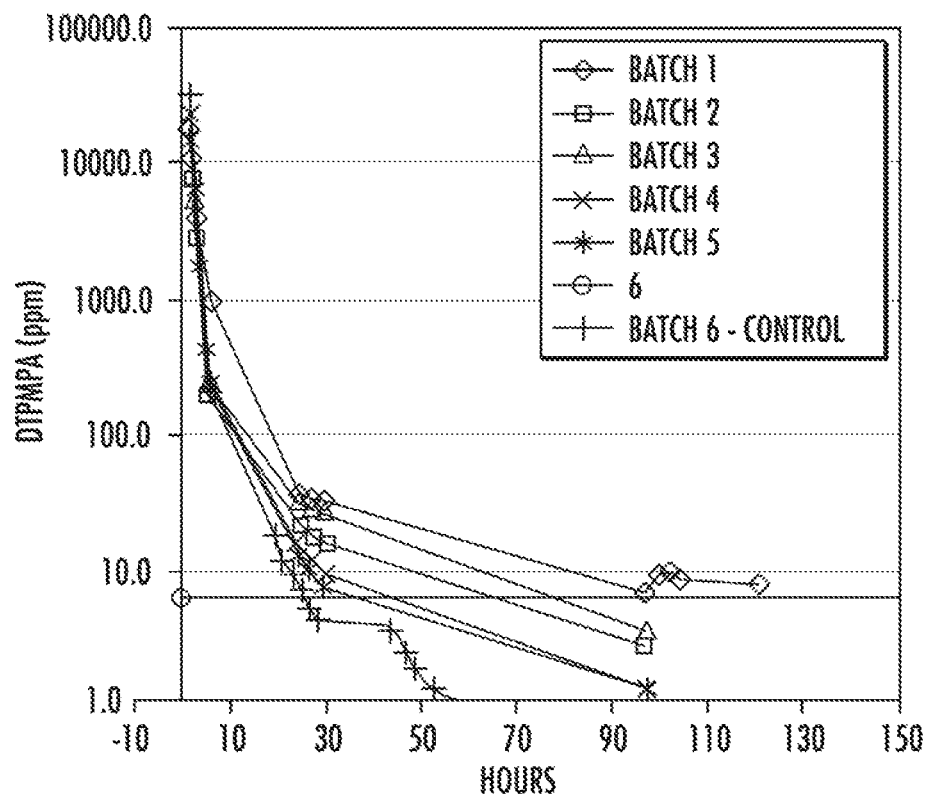
FIG. 13 is a graph of an elution profile for Example 1 in terms of DTPMP (diethylenetriamine penta(methylene phosphonic acid)) in parts per million (ppm) released as a function of time for porous ceramic proppant infused with DTPMP and encapsulated with various coatings.

After one hour, the eluent was tested for the amount of DTPMP (in parts per million, ppm) present. For each of proppant Batches 1-5, the eluent was subsequently tested for the presence of DTPMP at 2, 3, 6, 25, 27.5, 29.5, and 97.5 hours, respectively. For proppant Batch 1, the eluent was additionally tested for the presence of DTPMP at 100, 102, 104.5 and 120.5 hours. For Batch 6, the eluent was subsequently tested for the presence of DTPMP at 2, 3, 4, 5, 21, 22, 23, 24, 26, 27, 28, 29, 44, 47, 49, 53, 70 and 74 hours. The amount of DTPMP in ppm detected in the eluent was plotted as a function of time to obtain the elution profile curves shown in FIG. 13. In FIG. 13, a line has been drawn at 6 ppm which represents the minimum effective concentration of DTPMP as a corrosion and scale inhibitor. By plotting the amount of detected DTPMP in the eluent versus time for proppant Batches 1-6 and comparing these results with the 6 ppm line, the length of time a particular proppant batch elutes an effective amount of DTPMP can be determined.

FIG. 13 clearly shows that proppant Batches 1-5 which included a semi-permeable substantially non-degradable polymeric coating eluted an effective amount of DTPMP for a longer period of time compared to proppant Batch 6 which did not include a semi-permeable substantially non-degradable polymeric coating. FIG. 13 also clearly shows that for the three proppant batches that were infused with 5% by weight of DTPMP and coated with 2% by weight of phenol formaldehyde according to the two-step process, namely proppant Batches 1-3, the lower the viscosity of the resin used to make the phenol formaldehyde polymeric coating, the longer the period of time in which an effective amount of DTPMP was eluted. In addition, FIG. 13 shows that when phenol formaldehyde resins having relatively low viscosity are used to prepare the polymeric coating, the proppant coated according to the two-step process (Batch 1) eluted an effective amount of DTPMP for a longer period of time compared to proppant coated according to the one-step process (Batch 5). Finally, FIG. 13 shows that for the three proppant batches that were infused with 5% by weight of DTPMP and coated with 2% or 4% by weight of phenol formaldehyde according to the two-step process, namely proppant Batches 1-3, an effective amount of DTPMP was eluted for a longer period of time compared to proppant that was infused with 5% by weight of DTPMP and coated with 2% by weight of polyurethane according to the two-step process.

Example 2

Three 1000 pound plant batches of 20/40 CARBO Ultra-Lite, referred to below as Batches 7-9, were infused with the DTPMP solution mentioned above in Example 1 and were then coated according to the following procedure with a phenol formaldehyde standard reactivity resin that is commercially available from Plastics Engineering Company under the trade name Plenco 14941. Compared to the other phenol formaldehyde resins discussed above, the Plenco 14941 resin had a relatively medium viscosity of about 1850 cps at 150° C.

Each of Batches 7-9 were infused with 183.6 pounds of the DTPMP solution, such that the DTPMP constituted 7% by weight of the infused proppant. The proppant of Batches 7-9 was then coated with the phenol formaldehyde standard reactivity, medium viscosity polymer resin (Plenco 14941), in a two-step process. After the two-step process, the Batch 7 proppant included 0.5% by weight of the polymeric coating, the Batch 8 proppant included 1.0% by weight of the polymeric coating and the Batch 9 proppant included 2.0% by weight of the polymeric coating.

After the proppant particulates were infused with 7% DTPMP, each batch was coated with a different amount of the same semi-permeable substantially non-degradable polymer. The Batch 7 proppant was heated to 415° F. When the proppant reached the desired temperature, 6.6 pounds of the phenol formaldehyde, standard reactivity, medium viscosity polymer resin (Plenco 14941) was added to the proppant and allowed to melt and spread over the proppant for approximately 45 seconds. Next, 2.8 pounds of a 30% hexamine solution, and which is commercially available from The Chemical Company, was added to crosslink and cure the phenol formaldehyde resin and was allowed to mix for 25 seconds. Finally, 0.5 pound of a 50-60% cocoamidopropyl hydroxysultaine surfactant, which is commercially available from The Lubrizol Corporation under the trade name "Chembetaine™ CAS" was added and allowed to mix.

The Batch 8 proppant was heated to 415° F. When the proppant reached the desired temperature, 12.3 pounds of the phenol formaldehyde, standard reactivity, medium viscosity polymer resin (Plenco 14941) was added to the proppant and allowed to melt and spread over the proppant for approximately 45 seconds. Next, 5.2 pounds of a 30% hexamine solution, and which is commercially available from The Chemical Company, was added to crosslink and cure the phenol formaldehyde resin and was allowed to mix for 25 seconds. Finally, 0.5 pound of a 50-60% cocoamidopropyl hydroxysultaine surfactant, which is commercially available from The Lubrizol Corporation under the trade name "Chembetaine™ CAS" was added and allowed to mix.

The Batch 9 proppant was heated to 415° F. When the proppant reached the desired temperature, 22.7 pounds of the phenol formaldehyde, standard reactivity, medium viscosity polymer resin (Plenco 14941) was added to the proppant and allowed to melt and spread over the proppant for approximately 45 seconds. Next, 9.7 pounds of a 30% hexamine solution, and which is commercially available from The Chemical Company, was added to crosslink and cure the phenol formaldehyde resin and was allowed to mix for 25 seconds. Finally, 0.5 pounds of a 50-60% cocoamidopropyl hydroxysultaine surfactant, which is commercially available from The Lubrizol Corporation under the trade name "Chembetaine™ CAS" was added and allowed to mix.

Proppant Batches 7-9 of Example 2 were compared with proppant Batches 1, 2 and 6 from Example 1, as indicated in Table 3 below.

TABLE 3

Example 2 Batches

| Batch Number | Infusant/Polymer Coating |
|---|---|
| Batch 1 (from Example 1) | 5% by weight DTPMP, 2% by weight phenol formaldehyde, standard reactivity, low viscosity (Plenco 14870) |
| Batch 2 (from Example 1) | 5% by weight DTPMP, 2% by weight phenol formaldehyde, high reactivity, high viscosity (Plenco 14750) |
| Batch 6 (from Example 1) | 9% by weight DTPMP, no coating |
| Batch 7 | 7% by weight DTPMP, 0.5% by weight phenol formaldehyde, standard reactivity, medium viscosity (Plenco 14941) |
| Batch 8 | 7% by weight DTPMP, 1.0% by weight phenol formaldehyde, standard reactivity, medium viscosity (Plenco 14941) |
| Batch 9 | 7% by weight DTPMP, 2.0% by weight phenol formaldehyde, standard reactivity, medium viscosity (Plenco 14941) |

Proppant Batches 7-9 were then placed in a seawater eluent for one hour. The seawater eluent was prepared according to the ASTM D1141-98(2013) procedure and had the composition shown above in Table 2. After one hour, the eluent was tested for the amount of DTPMP present. The eluent was subsequently tested for the presence of DTPMP at 2, 3, 4, 5, 6, 7, 8, 25, 29, 33, and 48.5 hours, respectively. For proppant Batch 9, the eluent was additionally tested for the presence of DTPMP at 53.5 and 55.5 hours. For Batches 1, 2 and 6, the eluent was subsequently tested for the presence of DTPMP as described above in Example 1.

Figure 14:
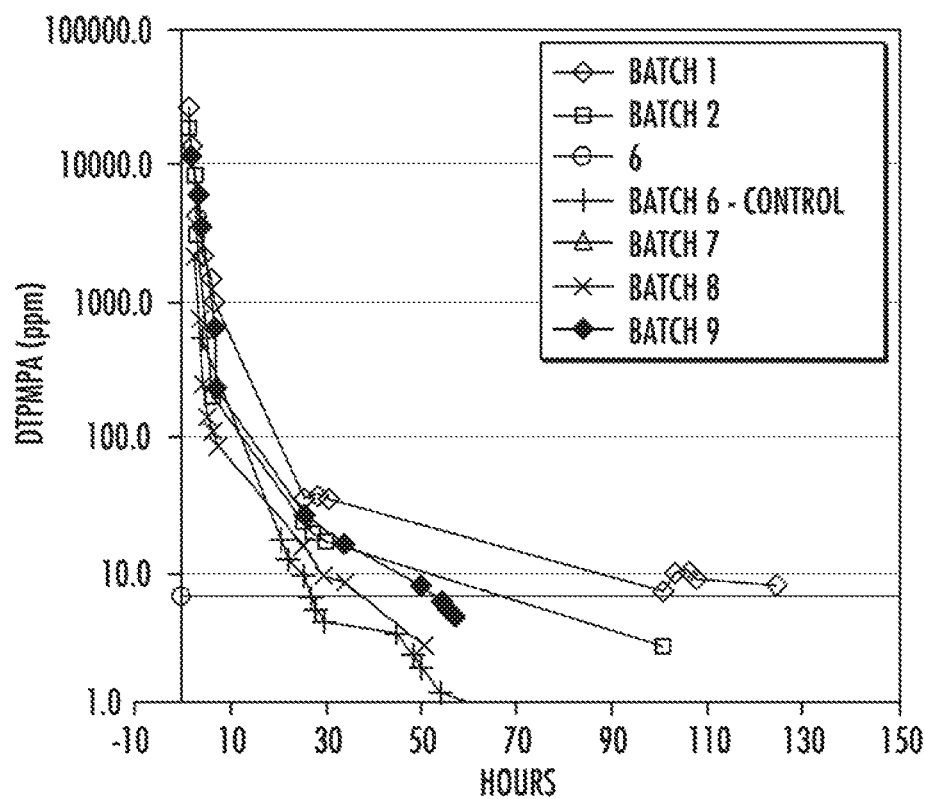
FIG. 14 is a graph of the elution profile for Example 2 in terms of the ppm of DTPMP released as a function of time for porous ceramic proppant infused with DTPMP and encapsulated with various coatings.

The amount of DTPMP in ppm detected in the eluent for Batches 7-9 was plotted with the data from Batches 1, 2 and 6 from Example 1 as a function of time to obtain the elution profile curves shown in FIG. 14. In FIG. 14, a line has been drawn at 6 ppm which represents the minimum effective concentration of DTPMP as a corrosion and scale inhibitor. By plotting the amount of detected DTPMP in the eluent versus time for proppant Batches 1-2 and 6-9 and comparing these results with the 6 ppm line, the length of time a particular proppant batch elutes an effective amount of DTPMP can be determined.

FIG. 14 clearly shows that proppant Batches 7-9 which included a semi-permeable substantially non-degradable polymeric coating eluted an effective amount of DTPMP for a longer period of time compared to proppant Batch 6 which did not include a semi-permeable substantially non-degradable polymeric coating. In addition, FIG. 14 clearly shows that for the three proppant batches that were infused with 7% by weight of DTPMP and coated with 0.5%, 1.0% and 2.0% by weight of phenol formaldehyde according to the two-step process, namely proppant Batches 7-9, an effective amount of DTPMP was eluted for a longer period of time the higher the percent by weight of the phenol formaldehyde polymeric coating.

Example 3

A 500 gram batch of 20/40 CARBO UltraLite, referred to below as Batch 10 was infused with 64.2 grams of the DTPMP solution mentioned above in Example 1, such that the DTPMP constituted 5% by weight of the infused proppant and was then coated with polylactic acid such that the final product included 2% by weight of the polylactic acid coating in a two-step thermal process. Polylactic acid is a degradable polymeric coating that is commercially available from Danimer under the trade name of "92938". 500 grams of the 20/40 CARBO UltraLite was heated in an oven set at 250° C. for one hour. 64.2 grams of the DTPMP solution was added to the heated proppant and allowed to mix for 3 minutes. The infused proppant was then heated to 193° C. and 51.0 grams of the polylactic acid polymer resin was added to the batch and allowed to mix for approximately ten minutes.

A 500 gram batch of 20/40 CARBO UltraLite, referred to below as Batch 11 was infused with DTPMP and coated with a polyurethane coating according to the procedure discussed above, except that 3.6 grams of the Ancarez ISO HDiT polyisocyanate polymer resin was used to result in a 2% by weight coating of polyurethane.

Proppant Batches 10 and 11 were compared with proppant Batches 1 and 6 from Example 1, as indicated in Table 4 below.

TABLE 4

Example 3 Batches

| Batch Number | Infusant/Polymer Coating |
|---|---|
| Batch 1 | 5% by weight DTPMP, 2% by weight phenol formaldehyde, standard reactivity, low viscosity (Plenco 14870) |
| Batch 6 | 5% by weight DTPMP, no coating |
| Batch 10 | 5% by weight DTPMP, 2% by weight polylactic acid |
| Batch 11 | 5% by weight DTPMP, 2% by weight polyurethane |

Proppant Batches 1, 6, 10 and 11 were then placed in a seawater eluent for one hour. The seawater eluent was prepared according to the ASTM D1141-98(2013) procedure and had the composition shown above in Table 2. After one hour, the eluent was tested for the amount of DTPMP present. The eluent was subsequently tested for the presence of DTPMP at 2, 3, 4, 5, 21, 22, 23, 24, 26, 27, 28, 29, 44, 47, 49, 53, 70 and 74 hours, respectively. For proppant Batch 1, the eluent was additionally tested for the presence of DTPMP at 93, 98, 165, 173, 189.5, 197.5 and 218 hours.

Figure 15:
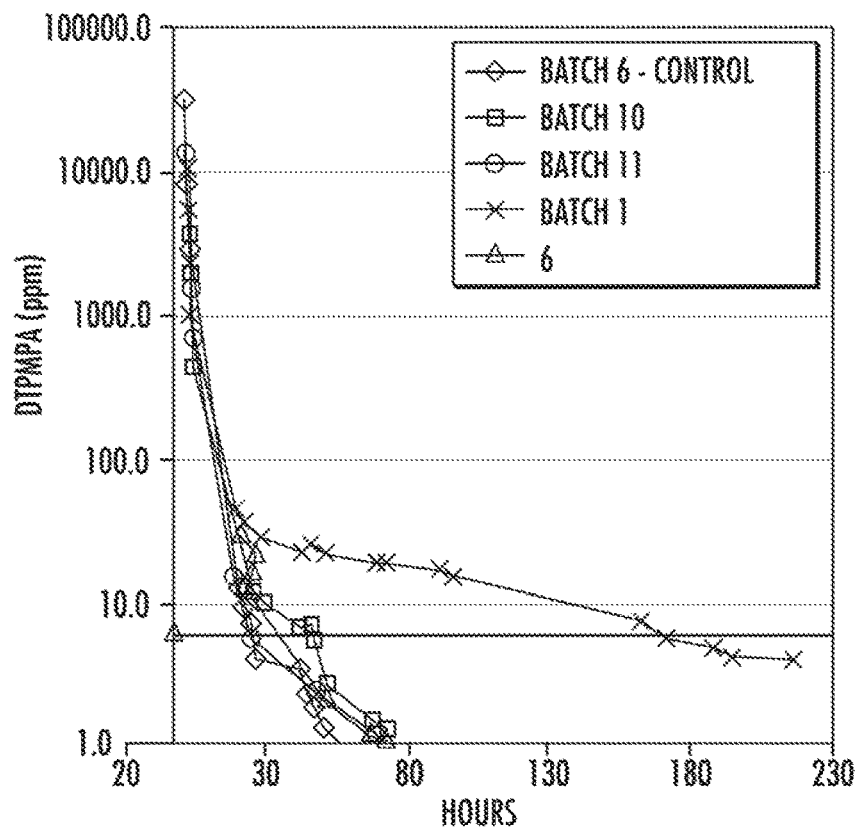
FIG. 15 is a graph of the elution profile for Example 3 in terms of the ppm of DTPMP released as a function of time for porous ceramic proppant infused with DTPMP and encapsulated with various coatings.

The amount of DTPMP in ppm detected in the eluent was plotted as a function of time to obtain the elution profile curves shown in FIG. 15. In FIG. 15, a line has been drawn at 6 ppm which represents the minimum effective concentration of DTPMP as a corrosion and scale inhibitor. By plotting the amount of detected DTPMP in the eluent versus time for proppant Batches 1, 6, 10 and 11 and comparing these results with the 6 ppm line, the length of time a particular proppant batch elutes an effective amount of DTPMP can be determined.

FIG. 15 clearly shows that proppant Batch 1 which was infused with 5% by weight of DTPMP and coated with 2% by weight of phenol formaldehyde according to the two-step process eluted an effective amount of DTPMP for a longer period of time compared to proppant Batches 10 and 11 which were infused with 5% by weight of DTPMP and coated with 2.0% by weight of polylactic acid and polyurethane, respectively. In addition, FIG. 15 shows that proppant Batches 10 and 11 which included a degradable and a semi-permeable substantially non-degradable polymeric coating, respectively, eluted an effective amount of DTPMP for a longer period of time compared to proppant Batch 6 which did not include a semi-permeable substantially non-degradable polymeric coating. FIG. 15 also shows that substantially similar results were obtained for proppant Batch 10, that was infused with 5% by weight of DTPMP and coated with 2.0% by weight of polylactic acid, a degradable polymer and proppant Batch 11 that was infused with 5% by weight of DTPMP and coated with 2.0% by weight of polyurethane, a semi-permeable substantially non-degradable polymer.

The above results show that infused proppant particulates coated with a semi-permeable substantially non-degradable polymer, like phenol formaldehyde and polyurethane, release effective amounts of chemical treatment agents like DTPMP for a longer period of time than typical degradable coatings or proppant without any coating at all.

Example 4

The example following below was carried out using exemplary materials in order to determine the elution rate of DTPMP from coated porous proppant infused with DTPMP and further coated with various amounts of degradable coatings and compared to coated porous proppant infused with DTPMP and not containing a degradable coating.

Three 500 gram batches of 20/40 CARBO UltraLite, an ultra-lightweight ceramic proppant having an ASG of 2.71 and having a porosity of 20-25% that is commercially available from CARBO Ceramics Inc., were each infused with a diethylenetriamine penta(methylene phosphonic acid) ("DTPMP") solution having a solids content of 41%, which is commercially available from Riteks, Inc., and were then coated with a semi-permeable substantially non-degradable polymer in a two-step process as described below.

Each batch of proppant was heated in an oven set to 482° F. (250° C.) for approximately one hour. The heated batches of proppant were then removed from the oven and allowed to cool until they reached a temperature of between 430-440° F. as monitored by a thermocouple. Once the proppant batches reached the desired temperature, 64.2 grams of the DTPMP solution was added to each batch and allowed to infuse into the proppant particulates for approximately three minutes, such that the DTPMP constituted 5% by weight of the infused proppant. After the proppant particulates were infused with DTPMP, each batch was coated with a semi-permeable substantially non-degradable polymer.

Each batch of proppant containing the 5% by weight DTPMP was then coated according to the following procedure with a phenol formaldehyde highly reactive, high viscosity polymer resin that is commercially available from Plastics Engineering Company under the trade name Plenco 14750. Each batch was placed in a heated mixing bowl and was monitored with a thermocouple until the proppant reached a temperature of between 410-420° F. When the proppant reached the desired temperature, 8.08 grams of the phenol formaldehyde resin was added to the proppant and allowed to melt and spread over the proppant for approximately 45 seconds. Next, 2.63 grams of a 40% hexamine solution made from a pure hexamine powder commercially available from Bossco Industries, Inc., was added to cross-link and cure the phenol formaldehyde resin and was allowed to mix for 1 minute and 25 seconds. After the phenol formaldehyde coating procedures, each batch of proppant included 2% by weight of the polymeric coating.

Only batches 1 and 2 of the proppant containing 2% by weight of the polymeric coating were subjected to a simultaneous application of degradable coating and water quench by applying the hot batches at a temperature of between 250-300° F. to a degradable shell solution, containing approximately 50% polyolefin and approximately 50% water, that is commercially available from Danimer Scientific under the trade name of "MHG-00254." Batch 1 was subjected to the MHG-00254 solution for 2 minutes and batch 2 was subjected to the MHG-00254 solution for 2 minutes, until Batch 1 had 2% by weight degradable shell and Batch 2 had 4% by weight degradable shell.

Finally, 1.2 grams of a 50-60% cocoamidopropyl hydroxysultaine surfactant, which is commercially available from The Lubrizol Corporation under the trade name "Chembetaine™ CAS", was added to each batch and allowed to mix for 1 minute.

Table 5 below represents the 3 batches prepared for this Example 4.

TABLE 5

Example 4 Batches

| Batch Number | Infusant/Polymer Coating/Degradable Shell |
| --- | --- |
| Batch 1 | 5% by weight DTPMP, 2% by weight phenol formaldehyde, high reactivity, high viscosity (Plenco 14750), 2% by weight polyolefin shell (MHG-00254) |
| Batch 2 | 5% by weight DTPMP, 2% by weight phenol formaldehyde, high reactivity, high viscosity (Plenco 14750), 4% by weight polyolefin shell (MHG-00254) |
| Batch 3 | 5% by weight DTPMP, 2% by weight phenol formaldehyde, high reactivity, high viscosity (Plenco 14750) |

Proppant Batches 1-6 were then placed in a seawater eluent for one hour. The seawater eluent was prepared according to the ASTM D1141-98(2013) procedure and had the composition shown below in Table 2, above.

After one hour, the eluent was tested for the amount of DTPMP (in parts per million, ppm) present. For Batches 1 and 2, the eluent was subsequently tested for the presence of DTPMP at 20 minutes, 40 minutes, and 60 minutes. For proppant Batch 3, the eluent was additionally tested for the presence of DTPMP at 10 minutes, 30 minutes, and 50 minutes.

Figure 16:
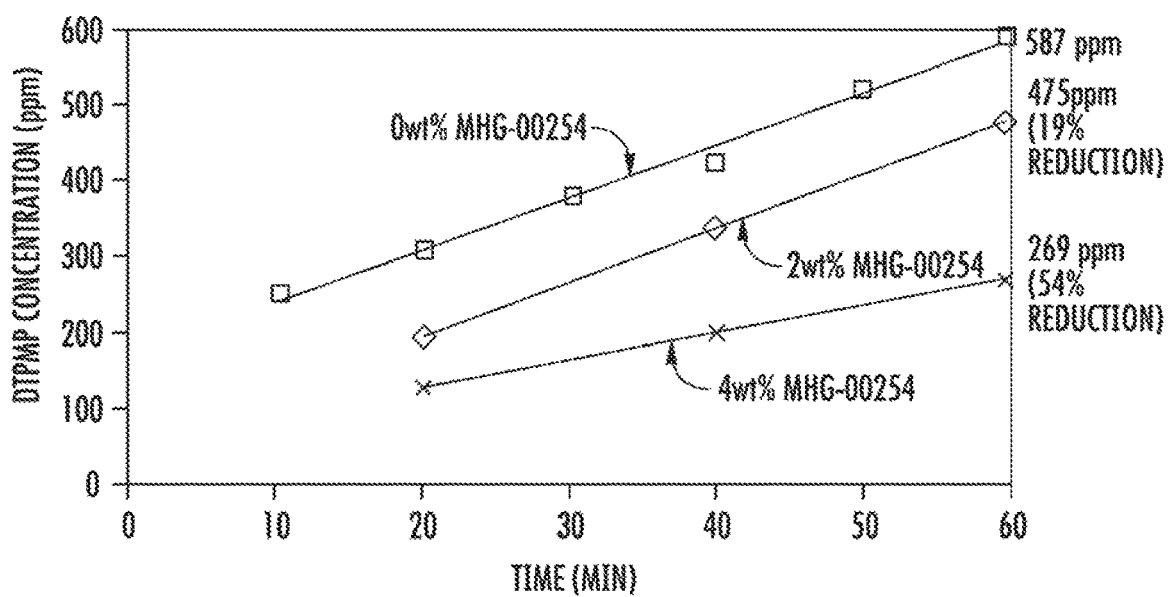
FIG. 16 is a graph of the elution profile for Example 4 in terms of the ppm of DTPMP released as a function of time for porous ceramic infused with DTPMP and encapsulated with and without a degradable shell of varied thickness.

The amount of DTPMP in ppm detected in the eluent was plotted as a function of time to obtain the elution profile curves shown in FIG. 16. FIG. 16 clearly shows that proppant Batches 1 and 2, which included the degradable shell, reduced the rate of initial elution of DTPMP compared to that of proppant Batch 3, which did not include a degradable shell. FIG. 16 also unexpectedly shows that doubling the amount of degradable coating (from 2 wt % to 4 wt %) almost tripled the reduction of DTPMP elution (from 19% to 54%, resepectively).

While the present disclosure has been described in terms of several exemplary embodiments, those of ordinary skill in the art will recognize that embodiments of the disclosure can be practiced with modification within the spirit and scope of the appended claims.

The present disclosure has been described relative to a several exemplary embodiments. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the disclosure will be employed without a corresponding use of other features. Accordingly, it is appropriate that the appended claims be construed broadly and in a manner consistent with the scope of the disclosure.

What is claimed is:

1. A fluid treatment system, comprising:
a cartridge having a cylindrical body configured to allow a fluid to flow therethrough, the cylindrical body having an interior volume in fluid communication with a system selected from the group consisting of a heat exchanger, a pipeline, and a surface pump and any combination thereof; and a plurality of particulates occupying at least a portion of the interior volume of the cylindrical body, wherein at least one particulate of the plurality of particulates comprises a porous ceramic particulate and a chemical treatment agent that separates from the at least one particulate upon contact with the fluid, wherein the chemical treatment agent is a scale inhibitor.

2. The fluid treatment system of claim 1, wherein each particulate comprises about 30 wt % to about 99.9 wt % alumina.

3. The fluid treatment system of claim 1, wherein each particulate has a size of about 4 mesh to about 120 mesh.

4. The fluid treatment system of claim 1, wherein each porous ceramic particulate has an internal interconnected porosity of about 35% to about 70%.

5. The fluid treatment system of claim 1, wherein each porous ceramic particulate has a bulk density of less than 2.2 g/cc.

6. A downhole tool, comprising:

a submersible pump having an inlet and an outlet; and a tubular in fluid communication with the inlet;

a cartridge having a cylindrical body configured to allow a fluid to flow therethrough, the cylindrical body connected to the tubular and having an interior volume in fluid communication with the inlet; and a plurality of particulates occupying at least a portion of the interior volume of the cylindrical body, wherein at least one particulate of the plurality of particulates comprises a porous ceramic particulate and a chemical treatment agent that separates from the at least one particulate upon contact with the fluid, wherein the chemical treatment agent is a scale inhibitor.

7. The downhole tool of claim 6, wherein each particulate comprises about 30 wt % to about 99.9 wt % alumina, has a size of about 4 mesh to about 120 mesh, an internal interconnected porosity of about 35% to about 70%, and a bulk density of less than 2.2 g/cc.

* * * * *